US010567677B2

(12) United States Patent
Hagisu et al.

(10) Patent No.: US 10,567,677 B2
(45) Date of Patent: Feb. 18, 2020

(54) FLOW LINE ANALYSIS SYSTEM AND FLOW LINE ANALYSIS METHOD

(71) Applicant: Panasonic i-PRO Sensing Solutions Co., Ltd., Fukuoka (JP)

(72) Inventors: Shinpei Hagisu, Fukuoka (JP); Tetsuo Tayama, Fukuoka (JP); Hidetoshi Kinoshita, Fukuoka (JP); Koji Yano, Kanagawa (JP); Manabu Nakamura, Fukuoka (JP); Takae Oguchi, Fukuoka (JP); Hideaki Takahashi, Fukuoka (JP)

(73) Assignee: Panasonic i-PRO Sensing Solutions Co., Ltd., Fukuoka (JP)

(*) Notice: Subject to any disclaimer, the term of this patent is extended or adjusted under 35 U.S.C. 154(b) by 327 days.

(21) Appl. No.: 15/099,352

(22) Filed: Apr. 14, 2016

(65) Prior Publication Data
US 2016/0307049 A1   Oct. 20, 2016

(30) Foreign Application Priority Data

Apr. 17, 2015 (JP) .................. 2015-085454

(51) Int. Cl.
*H04N 5/272*  (2006.01)
*G06K 9/00*  (2006.01)
(Continued)

(52) U.S. Cl.
CPC ............. *H04N 5/272* (2013.01); *G06F 21/60* (2013.01); *G06K 9/00342* (2013.01);
(Continued)

(58) Field of Classification Search
CPC ........ H04N 5/272; H04N 7/183; H04N 7/181; G06F 21/6254; G06F 21/60;
(Continued)

(56) References Cited

U.S. PATENT DOCUMENTS 4,179,704 A   12/1979   Moore et al.
4,233,631 A   11/1980   Mahler
(Continued)

FOREIGN PATENT DOCUMENTS

JP   08-242987 A   9/1996
JP   11-64505 A   3/1999
(Continued)

OTHER PUBLICATIONS

International Search Report dated Jul. 5, 2016, for corresponding International Application No. PCT/JP2016/002063, 9 pages.
(Continued)

*Primary Examiner* — Joseph G Ustaris
*Assistant Examiner* — Jill D Sechser
(74) *Attorney, Agent, or Firm* — Seed IP Law Group LLP

(57) ABSTRACT

A camera device transmits a captured image and flow line information of moving objects to a server device for each predetermined transmission period. The server device generates a flow line analysis image in which the flow line information of the moving objects is superimposed on the captured image and displays the generated flow line analysis image on a display. The server device displays a first flow line analysis image generated based on a captured image and flow line information in a first period which is arbitrary designated, and receives an instruction by a user operation to shift the first period by an amount. The server device sets a second period by shifting the first period by the amount without changing a length in period, and displays a second flow line analysis image generated based on a captured image and flow line information in the second period.

29 Claims, 21 Drawing Sheets

(51) Int. Cl.
*H04N 7/18* (2006.01)
*G06F 21/60* (2013.01)

(52) U.S. Cl.
CPC ...... *G06K 9/00711* (2013.01); *G06K 9/00778* (2013.01); *H04N 7/181* (2013.01); *H04N 7/183* (2013.01); *G06K 2009/00738* (2013.01); *G06T 2207/10016* (2013.01); *G06T 2207/20221* (2013.01); *G06T 2207/30196* (2013.01); *G06T 2207/30232* (2013.01)

(58) Field of Classification Search
CPC ........... G06K 9/00711; G06K 9/00778; G06K 9/00342; G06K 2009/00738; G06T 2207/10016; G06T 2207/20221; G06T 2207/30196; G06T 2207/30232
See application file for complete search history.

(56) References Cited

U.S. PATENT DOCUMENTS

| | | | |
|---|---|---|---|
| 6,295,367 B1 | 9/2001 | Crabtree et al. | |
| 6,992,702 B1 | 1/2006 | Foote et al. | |
| 7,590,261 B1 | 9/2009 | Mariano et al. | |
| 7,957,565 B1 | 6/2011 | Sharma et al. | |
| 7,974,869 B1 | 7/2011 | Sharma et al. | |
| 8,009,863 B1 | 8/2011 | Sharma et al. | |
| 8,098,888 B1 | 1/2012 | Mummareddy et al. | |
| 8,098,891 B2 | 1/2012 | Lv et al. | |
| 8,189,926 B2 | 5/2012 | Sharma et al. | |
| 8,280,153 B2 | 10/2012 | Cobb et al. | |
| 8,289,390 B2* | 10/2012 | Aggarwal | G01S 3/7864 340/522 |
| 8,310,542 B2 | 11/2012 | Girgensohn et al. | |
| 8,355,046 B2 | 1/2013 | Fujii | |
| 8,380,558 B1 | 2/2013 | Sharma et al. | |
| 8,558,892 B2 | 10/2013 | Brodsky et al. | |
| 8,614,744 B2 | 12/2013 | Brown et al. | |
| 8,964,036 B2 | 2/2015 | Golan et al. | |
| 8,965,042 B2* | 2/2015 | Borger | G07F 9/026 382/100 |
| 9,361,520 B2 | 6/2016 | Collins et al. | |
| 9,430,923 B2 | 8/2016 | Kniffen et al. | |
| 9,436,692 B1 | 9/2016 | Fang | |
| 9,569,786 B2 | 2/2017 | Shaw et al. | |
| 9,659,598 B2 | 5/2017 | Adam et al. | |
| 9,679,200 B2 | 6/2017 | Schlattmann et al. | |
| 9,875,408 B2 | 1/2018 | Adachi | |
| 10,120,536 B2 | 11/2018 | Cha et al. | |
| 2002/0085092 A1 | 7/2002 | Choi et al. | |
| 2003/0053659 A1 | 3/2003 | Pavlidis et al. | |
| 2005/0043933 A1 | 2/2005 | Rappaport et al. | |
| 2005/0169367 A1 | 8/2005 | Venetianer et al. | |
| 2005/0185823 A1 | 8/2005 | Brown et al. | |
| 2005/0288911 A1 | 12/2005 | Porikli | |
| 2006/0062431 A1 | 3/2006 | Low | |
| 2006/0187305 A1 | 8/2006 | Trivedi et al. | |
| 2006/0285723 A1 | 12/2006 | Morellas et al. | |
| 2007/0229663 A1 | 10/2007 | Aoto et al. | |
| 2007/0248244 A1* | 10/2007 | Sato | G06F 17/30265 382/103 |
| 2007/0296814 A1 | 12/2007 | Cooper et al. | |
| 2008/0130949 A1 | 6/2008 | Ivanov et al. | |
| 2008/0212099 A1 | 9/2008 | Chen | |
| 2009/0002489 A1 | 1/2009 | Yang et al. | |
| 2009/0134968 A1 | 5/2009 | Girgensohn et al. | |
| 2009/0222388 A1 | 9/2009 | Hua et al. | |
| 2009/0268028 A1* | 10/2009 | Ikumi | G06K 9/00295 348/150 |
| 2010/0002082 A1 | 1/2010 | Buehler et al. | |
| 2010/0013931 A1 | 1/2010 | Golan et al. | |
| 2010/0013935 A1 | 1/2010 | Ma et al. | |
| 2010/0045799 A1 | 2/2010 | Lei et al. | |
| 2010/0225765 A1 | 9/2010 | Kadogawa | |
| 2011/0002548 A1 | 1/2011 | Sivakumar et al. | |
| 2011/0072037 A1 | 3/2011 | Lotzer | |
| 2011/0199461 A1 | 8/2011 | Horio et al. | |
| 2011/0205355 A1 | 8/2011 | Liu et al. | |
| 2011/0231419 A1 | 9/2011 | Papke et al. | |
| 2012/0045149 A1 | 2/2012 | Arai et al. | |
| 2012/0163657 A1* | 6/2012 | Shellshear | G06K 9/00751 382/103 |
| 2012/0242853 A1 | 9/2012 | Jasinski et al. | |
| 2013/0091432 A1 | 4/2013 | Shet et al. | |
| 2013/0147961 A1 | 6/2013 | Gao et al. | |
| 2013/0223688 A1 | 8/2013 | Golan et al. | |
| 2014/0023233 A1* | 1/2014 | Stefanovic | G08B 13/19608 382/103 |
| 2014/0119594 A1* | 5/2014 | Chou | G07C 9/00 382/103 |
| 2014/0125805 A1* | 5/2014 | Golan | G06K 9/00771 348/150 |
| 2014/0226855 A1 | 8/2014 | Savvides et al. | |
| 2014/0355829 A1* | 12/2014 | Heu | G06K 9/00778 382/103 |
| 2015/0120237 A1 | 4/2015 | Gouda et al. | |
| 2015/0187088 A1 | 7/2015 | Iwai et al. | |
| 2015/0222861 A1 | 8/2015 | Fujii et al. | |
| 2015/0278608 A1 | 10/2015 | Matsumoto et al. | |
| 2015/0286866 A1 | 10/2015 | Kawaguchi et al. | |
| 2015/0289111 A1 | 10/2015 | Ozkan | |
| 2015/0379725 A1 | 12/2015 | Kuwahara et al. | |
| 2016/0063712 A1* | 3/2016 | Matsumoto | H04N 7/18 348/143 |
| 2016/0104174 A1 | 4/2016 | Matsumoto et al. | |
| 2016/0142679 A1 | 5/2016 | Miyoshi et al. | |
| 2016/0309096 A1 | 10/2016 | Hagisu et al. | |
| 2016/0349972 A1 | 12/2016 | Miyoshi et al. | |
| 2017/0330330 A1 | 11/2017 | Seki et al. | |
| 2017/0330434 A1 | 11/2017 | Takahashi et al. | |
| 2017/0337426 A1 | 11/2017 | Werner et al. | |
| 2017/0351924 A1 | 12/2017 | Hotta et al. | |
| 2017/0352380 A1 | 12/2017 | Doumbouya et al. | |
| 2018/0048789 A1 | 2/2018 | Hayashi | |

FOREIGN PATENT DOCUMENTS

| | | |
|---|---|---|
| JP | 11-144192 A | 5/1999 |
| JP | 2003-205159 A | 7/2003 |
| JP | 2003-256843 A | 9/2003 |
| JP | 2005-148863 A | 6/2005 |
| JP | 2006-309280 A | 11/2006 |
| JP | 2008-76234 A | 4/2008 |
| JP | 2009-134688 A | 6/2009 |
| JP | 2009-265830 A | 11/2009 |
| JP | 2010-231629 A | 10/2010 |
| JP | 2011-248836 A | 12/2011 |
| JP | 2011-254289 A | 12/2011 |
| JP | 2012-203680 A | 10/2012 |
| JP | 5597762 B1 | 10/2014 |
| JP | 5597781 B1 | 10/2014 |
| JP | 5683663 B1 | 3/2015 |
| JP | 2015-149557 A | 8/2015 |
| JP | 2015-149558 A | 8/2015 |
| JP | 2015-149559 A | 8/2015 |
| JP | 2016-15540 A | 1/2016 |
| JP | 2016-15579 A | 1/2016 |
| JP | 5838371 B1 | 1/2016 |
| WO | 2010-044186 A | 4/2010 |
| WO | 2013/072401 A2 | 5/2013 |

OTHER PUBLICATIONS

"An innovative monitor camera MOBOTIX Q24, 360° coverage can be monitored by only one camera never seen before", [online], OPN Corporation, 2014, [retrieved on Jun. 16, 2014], 13 pages.
Non-Final Office Action, dated Oct. 3, 2017, for corresponding U.S. Appl. No. 15/040,687, 32 pages.
Final Office Action, dated Apr. 26, 2018, for corresponding U.S. Appl. No. 15/040,687, 15 pages.
U.S. Appl. No. 15/040,687, filed Feb. 10, 2016, Flow Analysis and Flow Line Analysis Method.

(56) References Cited

OTHER PUBLICATIONS

Final Office Action, dated Oct. 23, 2018, for U.S. Appl. No. 15/484,931, 25 pages.
Final Office Action, dated Feb. 7, 2019, for U.S. Appl. No. 15/536,572, 9 pages.
Final Office Action, dated Mar. 20, 2019, for U.S. Appl. No. 15/040,687, 20 pages.
Mobotix, "MxAnalytics—Camera-Integrated Video Analysis With The MOBOTIX Q24," Security Vision Systems, 6 pages.
Non-Final Office Action, dated May 2, 2018, for U.S. Appl. No. 15/484,931, 28 pages.
Non-Final Office Action, dated Aug. 23, 2018, for U.S. Appl. No. 15/536,572, 9 pages.
Non-Final Office Action, dated Sep. 10, 2018, for U.S. Appl. No. 15/040,687, 19 pages.
Non-Final Office Action, dated Apr. 16, 2019, for U.S. Appl. No. 15/484,931, 32 pages.
Non-Final Office Action, dated Jun. 13, 2019, for U.S. Appl. No. 15/536,572, 9 pages.
U.S. Appl. No. 15/040,687, filed Feb. 10, 2016, Flow Line Analysis System and Flow Line Analysis Method.
U.S. Appl. No. 15/181,931, filed Apr. 11, 2017, Moving Information Analyzing System and Moving Information Analyzing Method.
U.S. Appl. No. 15/536,572, filed Jun. 15, 2017, Flow Line Analysis System and Flow Line Display Method.

* cited by examiner

[EXAMPLE OF FOOD SALES AREA ON 1F]

FLOW LINE ANALYSIS SYSTEM AND FLOW LINE ANALYSIS METHOD

BACKGROUND OF THE INVENTION

1. Field of the Invention

The present invention relates to a flow line analysis system and a flow line analysis method that generate a flow line analysis image in which staying information or passing information of a person is superimposed on an image captured by a camera device.

2. Description of the Related Art

For example, Japanese Patent Unexamined Publication No. 2009-134688 is known as a technology in the related art for displaying an activity level of a person for each time interval in an imaging location where a camera device is installed, as a heat map image.

In Japanese Patent Unexamined Publication No. 2009-134688, a technology is disclosed, in which an activity level is calculated by analyzing a flow line of a person in an imaging location where a security camera is installed via a network connection, a heat map image in which a detection result of a sensor is superimposed on a floor plan of the imaging location, is generated, and the heat map image is displayed on a screen of a browser corresponding to the security camera. In this way, by viewing the heat map image displayed on the screen of the browser, it is possible to ascertain the activity level of the person in the imaging location.

In addition, other than the floor plan disclosed in Japanese Patent Unexamined Publication No. 2009-134688, a technology for generating and displaying a heat map image in which a flow line density of a person or a detection result of the number of persons is superimposed on the image captured by the camera device is proposed. For example, refer to "An innovative monitor camera MOBOTIX Q24, 360° coverage can be monitored by only one camera never seen before", [online], OPN Corporation, 2014, [retrieved on 2014 Jun. 16], Retrieved from the Internet.

Here, in a case where the detection result of the sensor is superimposed on the floor plan in Japanese Patent Unexamined Publication NO. 2009-134688, it is necessary that the floor plan and the image from the security camera in the imaging location accurately match (coincide). However, in Japanese Patent Unexamined Publication No. 2009-134688, since the floor plan is not changed, the image and the floor plan match only in a case where there is no change in an arrangement of the imaging location from the time when the floor plan which is a base of the heat map image is created.

Here, a case is considered, in which the camera device captures an image of an imaging area (for example, a predetermined position in a store), and thereafter, a layout relating to an arrangement of a commodity shelf in the store is changed.

When generating the heat map image in which the staying information or the passing information of the person is superimposed on the image captured by the camera device, if the layout in the store is changed, the staying information or the passing information of the person before the change and the image captured by the camera device after the change do not match. Therefore, the heat map image having accurate staying information or passing information cannot be obtained.

Therefore, in Japanese Patent Unexamined Publication No. 2009-134688, it is necessary to change the layout in the floor plan at each time when the layout in the store is changed, and in NPL 1, since the image which is the base of the heat map image is an image obtained from an image captured by the camera device, the person appears in this image, and thus, a problem occurs that privacy of the person cannot be appropriately protected.

SUMMARY OF THE INVENTION

The present disclosure has an object to provide a flow line analysis system and a flow line analysis method in which privacy of a person reflected in an imaging area can be appropriately protected, an accurate flow line analysis image in which staying information or passing information of the person is superimposed on a background image updated at a predetermined timing is generated, and then, a trend among the flow line analysis images can be checked with a simple operation.

The present disclosure provides a flow line analysis system to which a camera device and a server device are connected. The camera device generates a background image of a captured image, extracts flow line information relating to a staying position or a passing position of a moving object, and transmits the generated background image, and the extracted flow line information of the moving object to the server device for each predetermined transmission period. The server device generates a flow line analysis image in which the flow line information of the moving object is superimposed on the background image, and displays the generated flow line analysis image on a displayer. In addition, the server device displays a second flow line analysis image which is generated based on a background image and flow line information in a second predetermined period according to a period changing operation with respect to a first flow line analysis image which is generated based on a background image and flow line information in a first predetermined period.

According to the present disclosure, privacy of a person reflected on the imaging area can be appropriately protected, and an accurate flow line analysis image in which staying information or passing information is superimposed on the background image updated in a predetermined timing can be generated, and thus, it is possible to check the trend among the flow line analysis images by a simple operation.

The present disclosure provides a flow line analysis system in which a camera device and a server device are connected each other, wherein the camera device generates a background image of a captured image, extracts flow line information relating to a staying position or a passing position of moving objects, counts a number of the moving object passing at least one line which is designated by the server device or an input device with respect to the captured image, based on the extracted flow line information, and transmits the generated background image, the extracted flow line information of the moving objects, and the count number corresponding to the at least one line to the server device for each predetermined transmission period. The server device generates a count number image in which the count number corresponding to the at least one line is superimposed on the background image, and displays the generated count number image on a display. The server device displays a first count number image which is generated based on a background image and flow line information in a first period and the count number corresponding to the at least one line, and then displays a second count number image which is generated based on a background image and flow line information in a second period and the count number corresponding to the at least one line when receiving a period changing operation.

Accordingly to the present disclosure, privacy of a person reflected on the imaging area can be appropriately protected, and an accurate person counting map image in which both staying information or passing information and a count number a moving object passes at least one line are superimposed on the background image updated in a predetermined timing can be generated, and thus, it is possible to check the trend among the flow line analysis images by a simple operation.

DETAILED DESCRIPTION OF THE PREFERRED EMBODIMENTS

Hereafter, an embodiment in which a flow line analysis system and a flow line analysis method according to the present invention are specifically disclosed (hereafter, referred to as "present embodiment") will be described in detail with reference to the appropriate drawings. However, in some cases, an excessively detailed description may be omitted. For example, there are cases where a detail description on the already well-known matters or a repeated description on substantially the same configuration is omitted. The reason for this is to avoid unnecessary redundant description and to facilitate easy understanding for those skilled in the art. The description below and the drawings are provided for those skilled in the art to sufficiently understand the present disclosure, and thereby do not have an intention of limiting the subject disclosed in the aspects of the invention. The present invention may be specified as a flow line analysis image generation method including an operation (step) of generating a flow line analysis image (refer to a description below) using a camera device.

Figure 1:
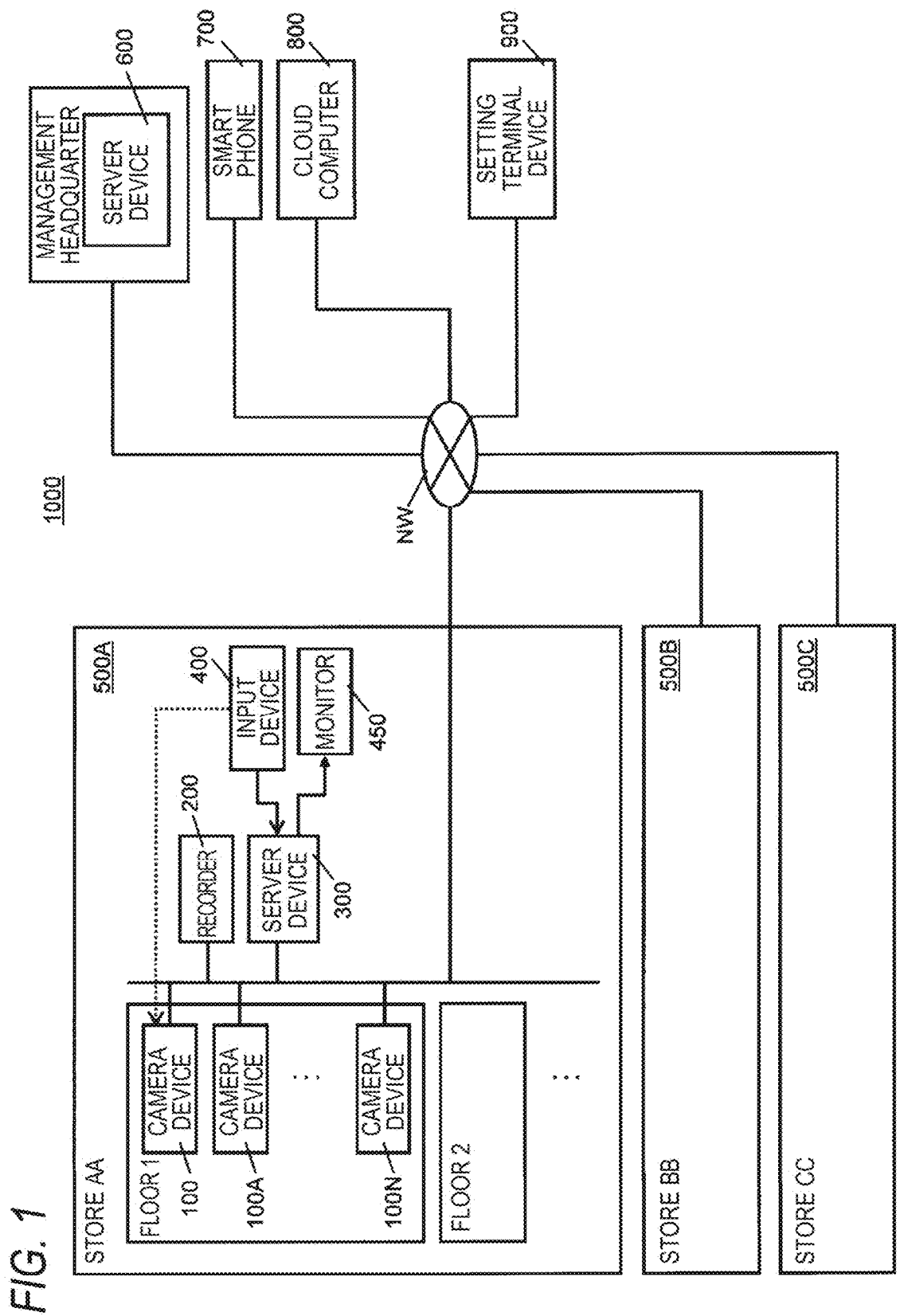
FIG. 1 is a system configuration diagram illustrating details of a system configuration of a sales management system including a flow line analysis system in the present embodiment.

In addition, in the present embodiment described below, as illustrated in FIG. 1, the description will be made under an assumption of a usage pattern of sales management system 1000, in which, for example, flow line analysis systems 500A, 500B, 500C, . . . according to the present invention are installed in each of a plurality of stores (store AA, store BB, and store CC), and a plurality of flow line analysis systems 500A, 500B, 500C, . . . are connected to each other via network NW. However, the embodiment of the flow line analysis system, a camera device, and a flow line analysis method according to the present invention is not limited to the contents in the present embodiment described below.

FIG. 1 is a system configuration diagram illustrating details of a system configuration of sales management system 1000 including flow line analysis systems 500A, 500B, 500C, . . . in the present embodiment. Sales management system 1000 illustrated in FIG. 1 is configured to include flow line analysis systems 500A, 500B, 500C, . . . respectively installed in a plurality of stores AA, BB, CC, . . . , server device 600 in a management headquarters, smart phone 700, cloud computer 800, and setting terminal device 900.

Each of flow line analysis systems 500A, 500B, 500C, . . . , server device 600 in the management headquarters, smart phone 700, cloud computer 800, and setting terminal device 900 are connected to each other via network NW. Network NW is a wireless network or a wired network. The wireless network is, for example, the local area network (LAN), the wide area network (WAN), the 3G, the long term evolution (LTE), or the wireless gigabit (WiGig). The wired network is, for example, an intranet or the internet.

Flow line analysis system 500A installed in store AA illustrated in FIG. 1 is configured to include a plurality of camera devices 100, 100A, . . . , 100N installed on floor 1, recorder 200, server device 300, input device 400, and monitor 450. A plurality of camera devices similar to floor 1 is also installed on floor 2 and the camera devices on floor 2 are omitted to be illustrated. The internal configurations of each of camera devices 100, 100A, . . . , 100N are the same, and the details thereof will be described below with reference to FIG. 2.

Recorder 200 is configured using, for example, a semiconductor memory or a hard disk device, and stores data of an image captured by the camera device installed in store AA (hereafter, the image captured by the camera device is referred to as "captured image"). The data of the captured image stored in recorder 200 is, for example, provided for a monitoring operation such as security affairs.

Server 300 is configured using, for example, a personal computer (PC), and notifies camera device 100 of the fact that a predetermined event (for example, a layout change of sales areas on floor 1 in store AA) has occurred according to an input operation of a user (for example, a user who operates the flow line analysis system and is a clerk or a manager of store AA, hereafter the same) who operates input device 400.

In addition, server device 300 generates a flow line analysis image in which flow line information relating to a staying position or a passing position of a moving object (for example, persons such as a clerk, a manager, and visiting customers, hereafter the same) in an imaging area of a camera device (for example, camera device 100) is superimposed on the captured image from the camera device (for example, camera device 100) using data (refer to description below) transmitted from the camera device (for example, camera device 100), and displays the flow line analysis image on monitor 450.

Furthermore, server device 300 performs predetermined processing (for example, flow line analysis report generation processing described below) according to an input operation a user who operates input device 400, and displays the flow line analysis report on monitor 450. Details of the internal configuration of server device 300 will be described below with reference to FIG. 2.

Input device 400 is configured using, for example, a mouse, a keyboard, and a touch panel or a touch pad, and outputs signals according to the input operation of the user to camera device 100 or server device 300. In FIG. 1, in order to make the drawing simple, an arrow is illustrated only between input device 400 and camera device 100. However, arrows may be illustrated between input device 400 and other camera devices (for example, camera devices 100A and 100N).

Monitor 450 is configured using, for example, a liquid crystal display (LCD) or an organic electroluminescence (EL), and displays the flow line analysis image or data of the flow line analysis report generated by server device 300. Monitor 450 is provided as an external device different from server device 300. However, monitor 450 may be configured to be included inside of server device 300.

Server device 600 in the management headquarters is a viewing device that acquires and displays the flow line analysis image or the flow line analysis report generated by flow line analysis systems 500A, 500B, 500C, . . . installed in each store AA, BB, CC, . . . according to the input operation of an employee (for example, an officer) in the management headquarters who operates server device 600 in the management headquarters. In addition, server device 600 in the management headquarters holds various information items (for example, sales information, information on the number of visiting customers, event schedule information, highest temperature information, and lowest temperature information) needed for generating the flow line analysis report (refer to FIG. 12). Those various information items may be held in the server devices installed for each store AA, BB, CC, . . . . Server device 600 in the management headquarters may execute each processing in the server devices installed in each store AA, BB, CC, . . . (for example, server device 300 in store A). In this way, server device 600 in the management headquarters can generate the flow line analysis report (for example, refer to FIG. 12 described below) by aggregating the data items of each store AA, BB, CC, . . . , can acquire detail data (for example, the flow line analysis report or the like illustrated in FIG. 12) of one store selected by the input operation to server device 600 in the management headquarters, or can perform the displaying of a data comparison result in a specific sales area (for example, a meat sales area) between a plurality of stores.

Smart phone 700 is a viewing device that acquires and displays the flow line analysis image or the flow line analysis report generated by flow line analysis systems 500A, 500B, 500C, . . . installed in each store AA, BB, CC, . . . according to the input operation of an employee (for example, a sales representative) in the management headquarters who operates smart phone 700.

Cloud computer 800 is an on line storage that stores the flow line analysis image or the data of the flow line analysis report generated by flow line analysis systems 500A, 500B, 500C, . . . installed in each store AA, BB, CC, . . . , performs predetermined processing (for example, searching and extraction of the flow line analysis report on Y date in M month) according to an input operation of the employee (for example, the sales representative) in the management headquarters who operates smart phone 700, and then, transmits the result of processing to smart phone 700.

Setting terminal device 900 is configured, for example, using a PC, and can cause dedicated browser software that displays a setting screen of the camera devices of flow line analysis systems 500A, 500B, 500C, . . . installed in each store AA, BB, CC, . . . to be executed. Setting terminal device 900 displays a setting screen (for example, common gateway interface (CGI)) of the camera device on the browser software according to an input operation of an employee (for example, a system manager of sales management system 1000) in the management headquarters who operates setting terminal device 900, and edits (modifies, adds, deletes) the setting information of the camera device.

Camera Device

Figure 2:
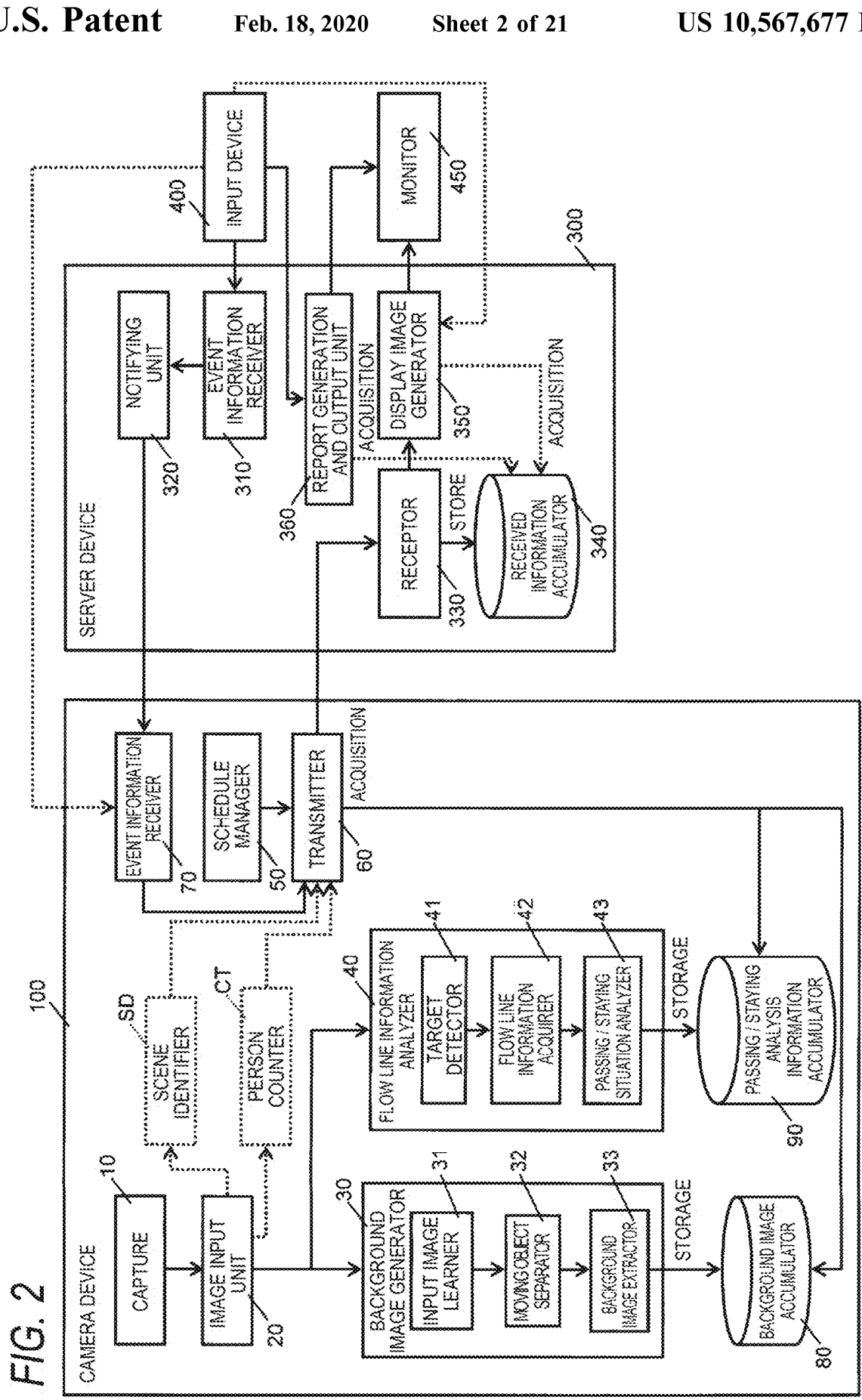
FIG. 2 is a block diagram illustrating details of a functional and internal configuration of a camera device and a server device in the present embodiment.

FIG. 2 is a block diagram illustrating details of a functional and internal configuration of camera device 100 and server device 300 in the present embodiment. In sales management system 1000 illustrated in FIG. 1, since each camera devices installed in stores A, B, C, . . . has the same configuration, respectively, in FIG. 2, the description will be made with camera device 100 as an example.

Camera device 100 illustrated in FIG. 2 is configured to include capture 10, image input unit 20, background image generator 30, flow line information analyzer 40, schedule manager 50, transmitter 60, event information receiver 70, background image accumulator 80, and passing/staying analysis information accumulator 90. Background image generator 30 has a configuration to include input image learner 31, moving object separator 32, and background image extractor 33. Flow line information analyzer 40 has a configuration to include target detector 41, flow line information acquirer 42, and passing/staying situation analyzer 43.

Capture 10 includes at least a lens and an image sensor. The lens condenses lights (rays) being incident from the outside of camera device 100 and forms an image on a predetermined imaging surface on the image sensor. A fish-eye lens or a wide angle lens from which an angle of view of equal to or higher than 140° can be obtained is used as the lens. The image sensor is a solid-state imaging device such as a charge coupled device (CCD) or a complementary metal oxide semiconductor (CMOS), and converts the optical image formed on the imaging surface to an electric signal.

Image input unit 20 is configured using, for example, a central processing unit (CPU), a micro processing unit (MPU), or a digital signal processor (DSP), and performs predetermined signal processing using the electric signal from capture 10, generates data (frame) of the captured image defined by RGB (red, green, and blue) or YUV (brightness and color difference) that can be recognized by a person, and then, outputs the data to background image generator 30 and flow line information analyzer 40.

Background image generator 30 is configured using, for example, the CPU, the MPU, or the DSP and generates a background image in which the moving object (for example, a person) included in the captured image is eliminated, at a predetermined frame rate (for example, 30 frames per second (fps)) for each piece of data (frame) of the captured image output from image input unit 20, and then, holds the background image in background image accumulator 80. In the background image generation processing in background image generator 30, a method disclosed in reference patent literature Japanese Patent Unexamined Publication No. 2012-203680 can be used, but the method is not limited to the reference patent literature.

Figure 3:
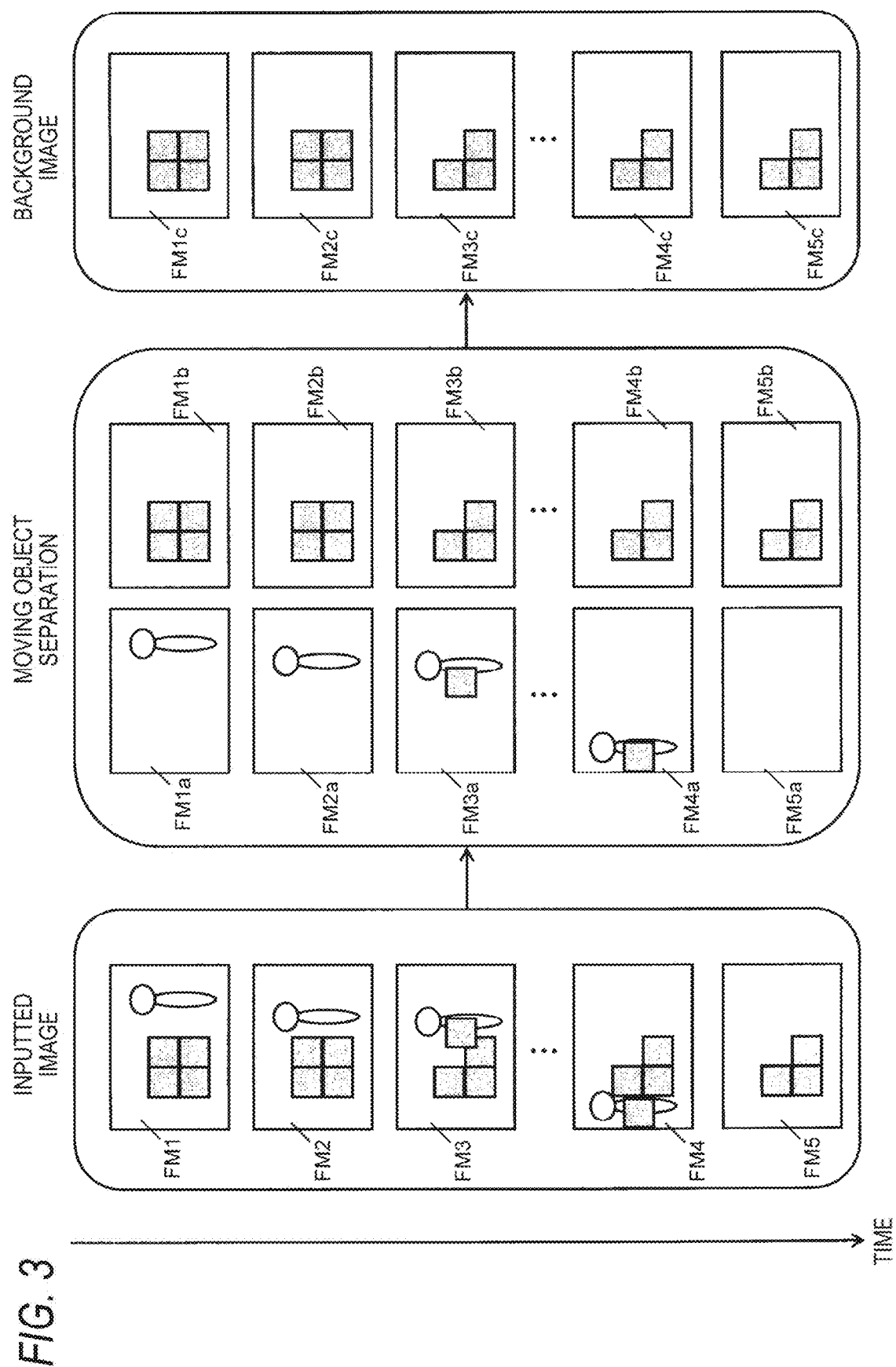
FIG. 3 is a diagram describing an operation overview of a background image generator in a camera device in the present embodiment.
Figure 4A:
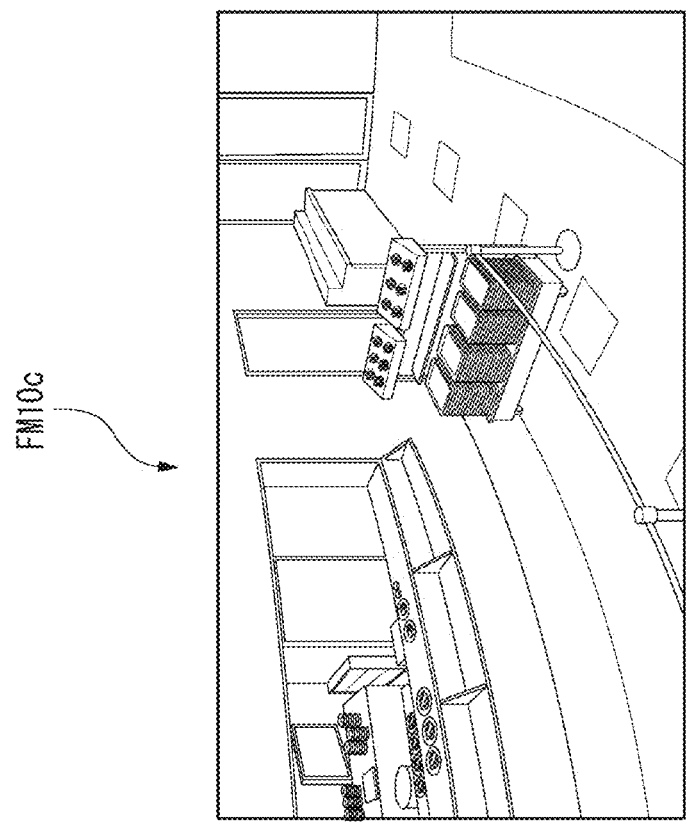
FIG. 4A is a picture illustrating an example of a captured image input to an image input unit and FIG. 4B is a picture illustrating an example of a background image generated by the background image generator.
Figure 4B:
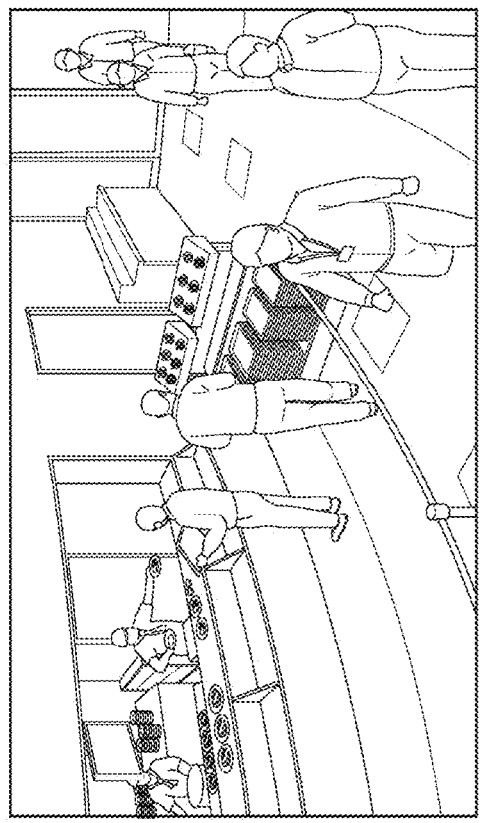

Here, an operation overview of background image generator 30 will be briefly described with reference to FIG. 3, FIG. 4A and FIG. 4B. FIG. 3 is a diagram describing an operation overview of background image generator 30 in camera device 100 in the present embodiment. FIG. 4A is a picture illustrating an example of a captured image input to image input unit 20 and FIG. 4B is a picture illustrating an example of a background image generated by background image generator 30.

In FIG. 3, generation results of input image learner 31, moving object separator 32, and background image extractor 33 are schematically illustrated toward a direction from the left side of a sheet to the right side which is perpendicular to a time axis toward the bottom side of the sheet from the top side. A state in which a visiting customer of the store carries one cardboard box among four cardboard boxes containing beverage is illustrated.

Input image learner 31 analyzes a distribution state of values of the brightness and the color difference between each pixel in each of the frames (for example, each frame FM1 to FM5 illustrated in FIG. 3) of the plurality of captured images output from image input unit 20.

Moving object separator 32 separates the learning result of input image learner 31 (that is, the analysis result of the distribution states of the brightness and the color difference for each of the same pixels between the plurality of frames (for example, in the time axis direction illustrated in FIG. 3)) into moving object (for example, a person) information (for example, refer to frames FM1a to FM5a) and non-moving object (for example, a background) information (for example, refer to frames FM1b to FM5b) for each frame FM1 to FM5 of captured images. In frames FM3 and FM4 of the captured images illustrating the state of a person which is a moving object carrying the cardboard box, the values of the brightness and the color difference corresponding to the pixel of the cardboard box carried by the person are changed along the time axis direction (for example, refer to FIG. 3). Therefore, moving object separator 32 regards the cardboard box carried by the person as being the moving object.

Background image extractor 33 extracts frames FM1b to FM5b which reflect the non-moving object information among the information separated by moving object separator 32 as frames FM1c to FM5c of the background images from frames FM1 to FM5 of the captured images output from image input unit 20, and then, holds the frames in background image accumulator 80.

In frame FM10a of the captured image illustrated in FIG. 4A, a person who provides food and a person who receives the food on a tray in a restaurant are illustrated as moving objects respectively. In frame FM10c (refer to FIG. 4B) of the background image generated by background image generator 30 with respect to frame FM10a of the captured image illustrated in FIG. 4A, both the person who provides food and the person who receives the food in the same restaurant are eliminated so as not to be reflected as the moving object.

Flow line information analyzer 40 is configured using, for example, the CPU, the MPU, or the DSP, and detects flow line information relating to the staying position or the passing position of the moving object (for example, a person) included in the captured image, at a predetermined frame rate (for example, 10 fps) for each piece of data (frame) of the captured image output from image input unit 20, and then, holds the flow line information in passing/staying analysis information accumulator 90.

Target detector 41 performs predetermined image processing (for example, person detection processing or face detection processing) on the frames of the captured images output from image input unit 20, and then, detects the presence or absence of the moving object (for example, a person) included in the frames of the captured image. In a case where the moving object included in the frames of the captured image is detected, target detector 41 outputs the information (for example, coordinates information on the frame) relating to the detection area of the moving object in the frame of the captured image to flow line information acquirer 42. In a case where the moving object included in the frames of the captured image is not detected, target detector 41 outputs the information (for example, predetermined null information) relating to the detection area of the moving object to flow line information acquirer 42.

Flow line information acquirer 42 performs a linkage of the information items relating to the past and current detection areas using the information of the captured image output from image input unit 20 and the information (for example, the captured image information and the coordinates information) relating to the detection area of the past moving object based on the information relating to the detection area of the moving object output from target detector 41, and then, outputs the linked information to passing/staying situation analyzer 43 as the flow line information (for example, an amount of change of the coordinates information of the detection area of the moving object).

Passing/staying situation analyzer 43 extracts the flow line information (for example, "target position information", "flow line information", and "information relating to a passing situation or a staying situation") relating to the staying position or the passing position of the moving object (for example, the person) in the frame of the captured image with respect to the plurality of captured images based on the flow line information output from flow line information acquirer 42, and then, generates the flow line analysis image. In addition, passing/staying situation analyzer 43 may generate a visible image of a colored portion of the flow line analysis image (heat map image) generated by display image generator 350 in server device 300 using the result of extracting the flow line information relating to the staying position and the passing position of the moving object (for example, the person).

Passing/staying situation analyzer 43 can extract accurate flow line information relating to the position where the moving object (for example, the person) stayed or passed among the frames of the captured image output from image input unit 20 using the flow line information relating to the frame of the plurality of captured images, and then, generate the flow line analysis image.

Schedule manager 50 is configured using, for example, a CPU, an MPU, or a DSP, and notifies transmitter 60 of a predetermined transmission period for periodically transmitting the background image data stored in background image accumulator 80 and the data of the result of extracting the flow line information relating to the staying information or the passing information of the moving object stored in passing/staying analysis information accumulator 90 to server device 300. The predetermined transmission period is, for example, 15 minutes, 1 hour, 12 hours, or 24 hours, but not limited to those time intervals.

Transmitter 60 acquires the background image data stored in background image accumulator 80 and the data of the result of extracting the flow line information relating to the staying information or the passing information of the moving object stored in passing/staying analysis information accumulator 90 according to the notification from schedule manager 50 or event information receiver 70, and then, transmits the acquired data items to server device 300. Transmission timing in transmitter 60 will be described below with reference to FIG. 5, FIG. 6, FIG. 7 and FIG. 8.

Event information receiver 70 as an example of the event information acquirer receives (acquires) a notification of detecting a predetermined event from server device 300 or input device 400 (for example, a change of the layout of sales areas on floor 1 in store AA), and upon receiving the notification that the predetermined event is detected, then, outputs a transmission instruction to transmitter 60 to transmit the background image data stored in background image accumulator 80 and the data of the result of extracting the flow line information relating to the staying information or the passing information of the moving object stored in passing/staying analysis information accumulator 90 to server device 300.

Background image accumulator 80 is configured using, for example, a semiconductor memory or a hard disk device, and stores the background image data (frames) generated by background image generator 30.

Passing/staying analysis information accumulator 90 is configured using, for example, a semiconductor memory or a hard disk device, and stores the data of the result (for example, "target position information", "flow line information", and "information relating to the passing situation or the staying situation") of extracting the flow line information relating to the staying position or the passing position of the moving object (for example, the person) generated by flow line information analyzer 40.

Figure 13:
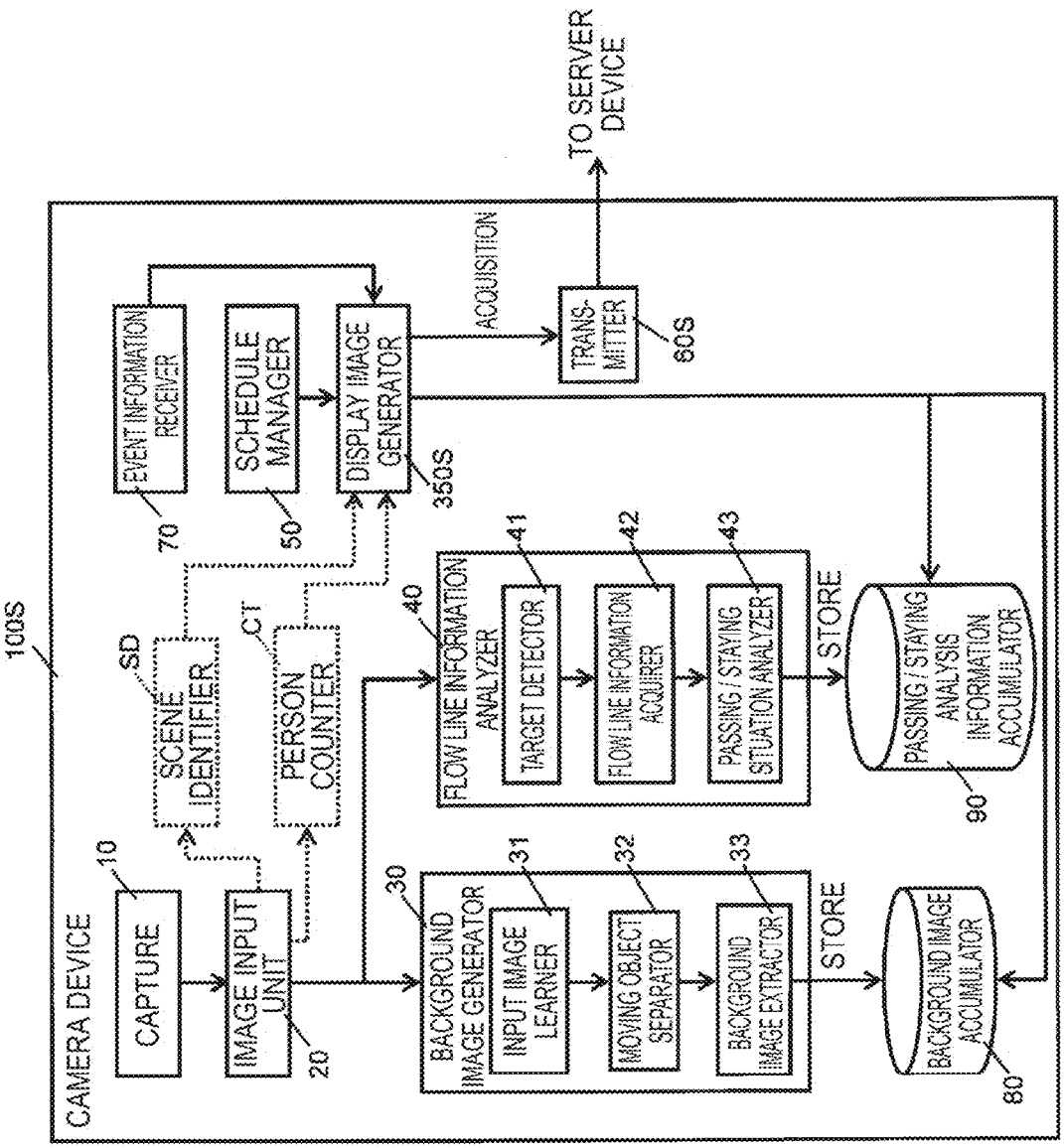
FIG. 13 is a block diagram illustrating details of the functional and internal configurations of the camera device in a first modification example of the present embodiment.

In camera device 100 illustrated in FIG. 2 scene identifier SD may be provided instead of event information receiver 70, and the same hereafter (for example, refer to FIG. 13). Scene identifier SD as an example of an image change detector detects the presence or absence of a change (for example, an event in which the layout of the sales area on floor 1 in store AA is changed) in the captured image output from image input unit 20. In a case where the change in the captured image is detected, scene identifier SD outputs a transmission instruction to transmitter 60 to transmit the background image data stored in background image accumulator 80 and the data of the result of extracting the flow line information relating to the staying information or the passing information of the moving object stored in passing/staying analysis information accumulator 90 to server device 300.

In addition, camera device 100 illustrated in FIG. 2 may further include person counter CT, and the same hereafter (for example, refer to FIG. 13). Person counter CT as an example of a moving object detector performs predetermined image processing (for example, person detection processing) on the captured image output from image input unit 20, and then, counts the number of detected moving objects included in the captured image. Person counter CT outputs the information relating to the number of detected moving objects included in the captured image to transmitter 60.

Server Device

Server device 300 illustrated in FIG. 2 is configured to include event information receiver 310, notifying unit 320, receptor 330, received information accumulator 340, display image generator 350, and report generation and output unit 360.

In a case where the information indicating that the predetermined event (for example, the change of the layout of the sales area on floor 1 in store AA) has occurred for each camera device (for example, camera device 100) is input from input device 400, event information receiver 310 receives the notification that the predetermined event is detected. Event information receiver 310 outputs the reception of the notification that the predetermined event is detected to notifying unit 320. In the information indicating the occurrence of the predetermined event includes an identification number (for example, C1, C2, . . . described below) of the camera device that captures the image of the position where the predetermined event has occurred as an imaging area.

Notifying unit 320 transmits the notification that the predetermined event is detected output from event information receiver 310 to the correspondent camera device (for example, camera device 100).

Receptor 330 receives the data (that is, the background image data stored in background image accumulator 80 and the data of the result of extracting the flow line information relating to the staying information or the passing information of the moving object stored in passing/staying analysis information accumulator 90) transmitted from transmitter 60 in camera device 100 and outputs the data to received information accumulator 340 and display image generator 350.

Received information accumulator 340 is configured using, for example, a semiconductor memory or a hard disk device, and stores the data (that is, background image data stored in background image accumulator 80 and the data of the result of extracting the flow line information relating to the staying information or the passing information of the moving object stored in passing/staying analysis information accumulator 90) received by receptor 330.

Display image generator 350 as an example of an image generator is configured using, for example, a CPU, an MPU, and a DSP, and generates a flow line analysis image in which the flow line information relating to the staying position or the passing position of the moving object is superimposed on the background image using the data (that is, background image data stored in background image accumulator 80 and the data of the result of extracting the flow line information relating to the staying information or the passing information of the moving object stored in passing/staying analysis information accumulator 90) acquired from receptor 330 or received information accumulator 340.

The flow line analysis image is a quantitatively visualized image in which the flow line information visually indicates that where the moving object frequently stays or where the moving object passes in the imaging area corresponding to the captured image within a predetermined range (for example, values of 0 to 255) of the background image where the moving object (for example, the person) is eliminated so as not to be reflected in the image captured by camera device 100, as a heat map. In addition, display image generator 350 as an example of a display controller displays the generated flow line analysis image on monitor 450.

Report generation and output unit 360 as an example of a report generator is configured using, for example, a CPU, an MPU, and a DSP, and generates a flow line analysis report (refer to FIG. 12) described below in a case where an instruction to generate the flow line analysis report is input from input device 400. In addition, report generation and output unit 360 as an example of the display controller displays the generated flow line analysis report on monitor 450.

Data Transmission Processing from Camera Device to Server Device

Figure 5:
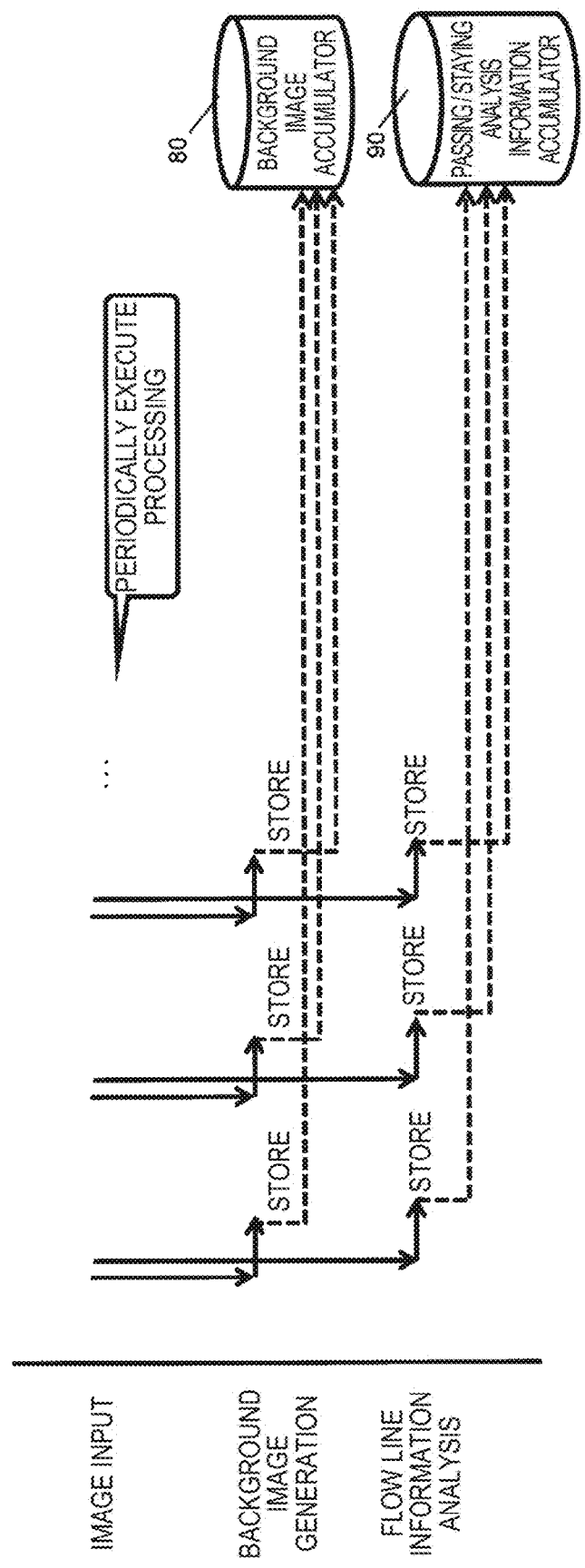
FIG. 5 is a time chart diagram describing an operation timing of each processing of inputting the image, generating the background image, and analyzing the flow line information by the camera device in the present embodiment.
Figure 6:
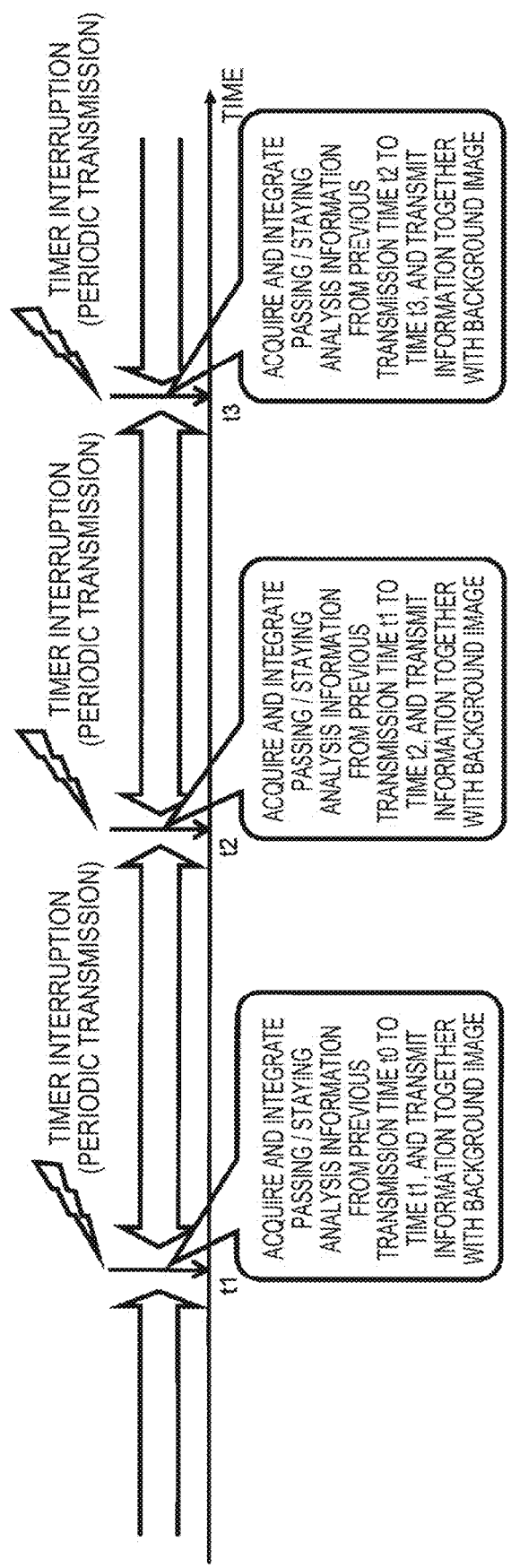
FIG. 6 is a time chart diagram in a case where the camera device in the present embodiment periodically performs transmission processing.
Figure 7:
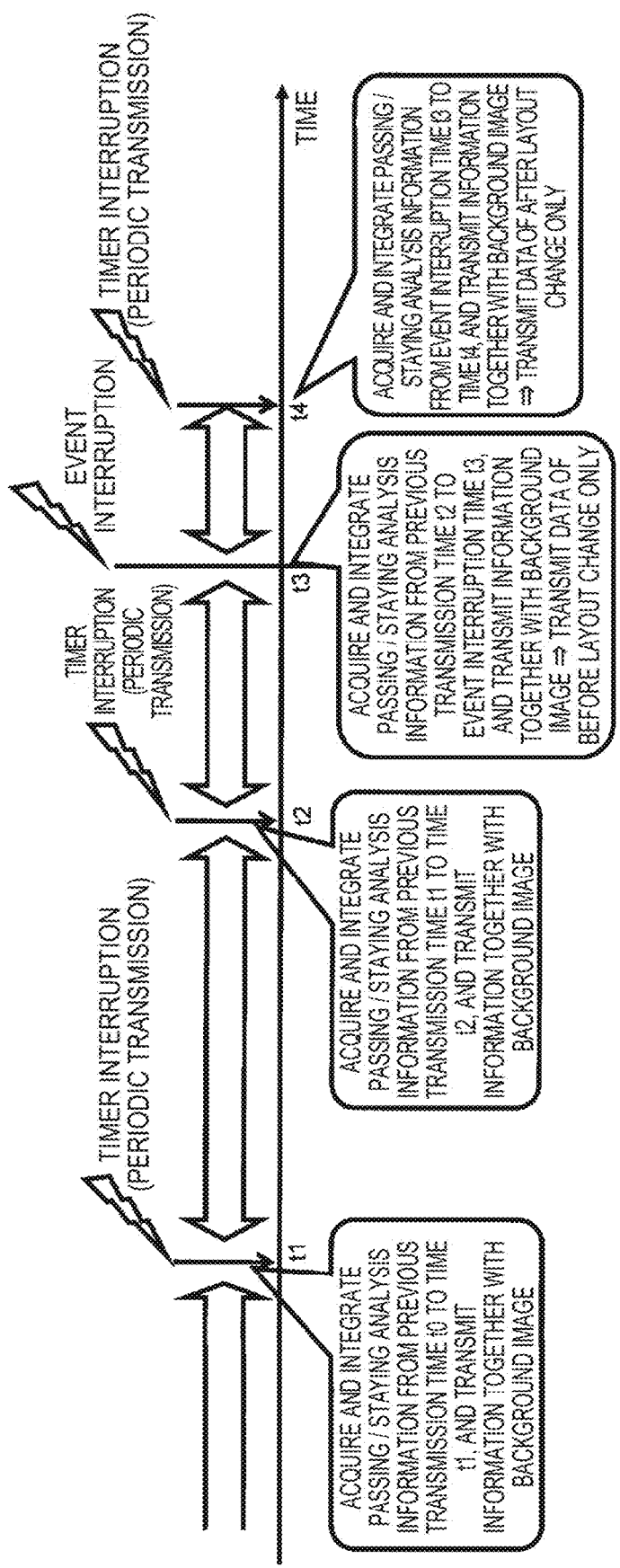
FIG. 7 is a time chart diagram in a case where the camera device in the present embodiment changes the operation timing for the transmission processing according to a detection of an event.
Figure 8:
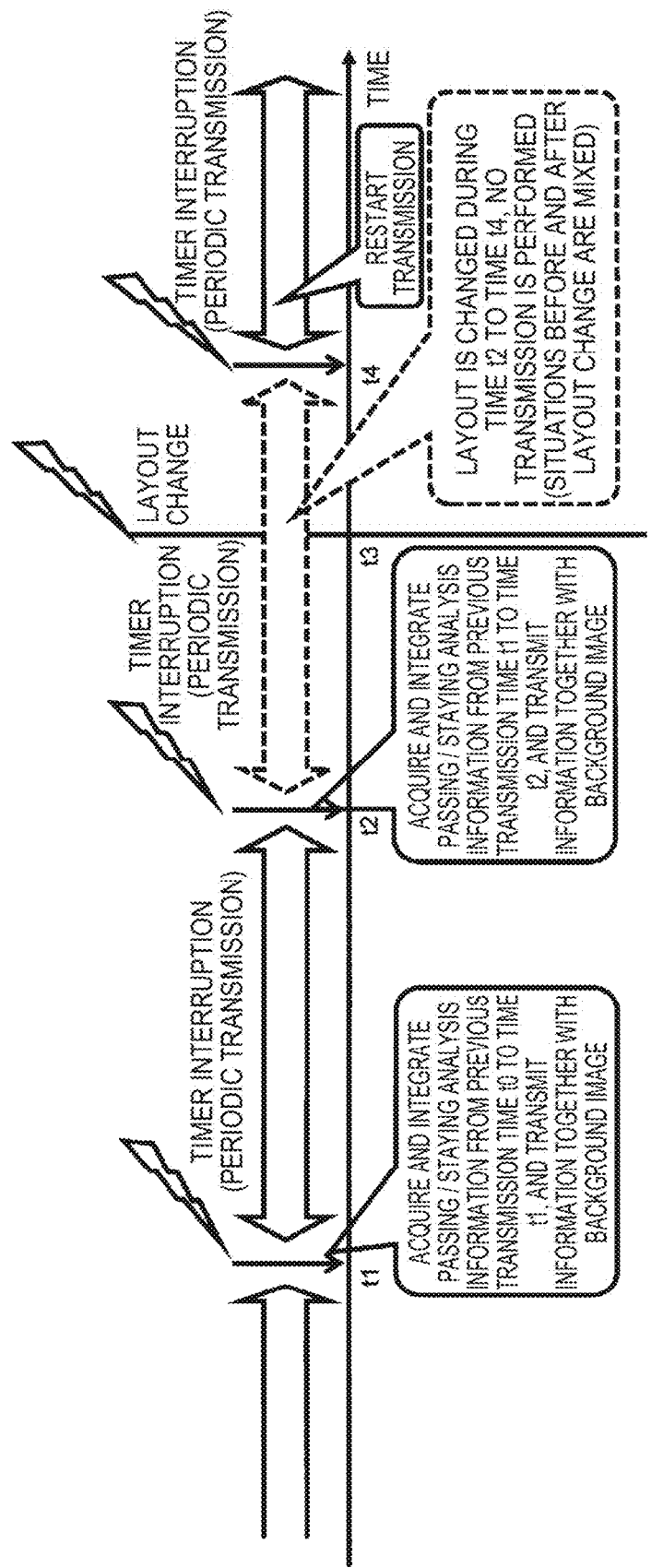
FIG. 8 is a time chart diagram in a case where the camera device in the present embodiment refrains from performing the transmission processing before and after the detection of the event.

Next, data transmission processing from camera device 100 to server device 300 will be described with reference to FIG. 5, FIG. 6, FIG. 7, and FIG. 8. FIG. 5 is a time chart diagram describing an operation timing of transmission processing of camera device 100 in the present embodiment. FIG. 6 is a time chart diagram in a case where camera device 100 in the present embodiment periodically performs transmission processing. FIG. 7 is a time chart diagram in a case where camera device 100 in the present embodiment changes the operation timing for the transmission processing according to a detection of an event. FIG. 8 is a time chart diagram in a case where camera device 100 in the present embodiment refrains from performing the transmission processing before and after the detection of the event.

In FIG. 5, in camera device 100, when a captured image is output from image input unit 20 (image input), background image generator 30 generates a background image of the captured image output from image input unit 20 and holds the background image in background image accumulator 80 (generation of the background image), and flow line information analyzer 40 extracts flow line information relating to the staying position or the passing position of the moving object (for example, the person) included in the captured image output from image input unit 20 (flow line information analysis). Each processing task of the image input, the generation of the background image, and the flow line information analysis is periodically and repeatedly executed. However, as long as those processing tasks of the image input, the generation of the background image, and the flow line information analysis are periodically and repeatedly executed, the interval of each processing task may not be the same.

For example, after the first execution of each of those processing tasks of the image input, the generation of the background image, and the flow line information analysis illustrated in FIG. 5, when it is an expiration time of the transmission period notified from schedule manager 50 as illustrated in FIG. 7, transmitter 60 receives, for example, a timer interruption from schedule manager 50, and acquires the background image data stored in background image accumulator 80 and data of the result of extracting the flow line information relating to the staying information or the passing information of the moving object stored in passing/staying analysis information accumulator 90 from previous transmission time t0 to current transmission time t1, and then, transmits the data items to server device 300 (time t1). As described above, the periodical transmission intervals (transmission period) in transmitter 60 are 15 minutes, 1 hour, 12 hours, or 24 hours, and are notified from schedule manager 50. In addition, the background image data transmitted from transmitter 60 may be data for one image or may be data for a plurality of images (for example, a plurality of background images obtained for every 5 minutes).

Next, at the time of the second execution of each processing task of the image input, the generation of the background image, and the flow line information analysis illustrated in FIG. 5 and subsequent thereto, when it becomes the expiration time of the transmission period notified from schedule manager 50 as illustrated in FIG. 7, transmitter 60 receives, for example, a timer interruption from schedule manager 50, and acquires the background image data stored in background image accumulator 80 and data of the result of extracting the flow line information relating to the staying information or the passing information of the moving object stored in passing/staying analysis information accumulator 90 from previous transmission time t1 to current transmission time t2, and then, transmits the data items to server device 300 (time t2).

In addition, as illustrated in FIG. 7, when a notification that the predetermined event (for example, the change of the layout of the sales area on floor 1 in store AA) is detected is received from event information receiver 70 (time t3), transmitter 60 receives, for example, a timer interruption from event information receiver 70, and acquires the background image data stored in background image accumulator 80 and the data of the result of extracting the flow line information relating to the staying information or the passing information of the moving object stored in passing/staying analysis information accumulator 90 from previous transmission time t2 to current transmission time t3, and then, transmits the data items to server device 300 (time t3). The method of transmission processing in transmitter 60 may be in accordance with any method in either of FIG. 6 or FIG. 8, excluding FIG. 7.

In FIG. 6, FIG. 7, and FIG. 8, the description on the transmission processing having the same content as in FIG. 5 will be simplified or omitted, and the content different from that will be described. Specifically, in FIG. 6, even when an event interruption is received from event information receiver 70 in t3, transmitter 60 refrains from transmitting the background image data stored in background image accumulator 80 and the data of the result of extracting the flow line information relating to the staying information or the passing information of the moving object stored in passing/staying analysis information accumulator 90 to server device 300 from previous transmission time t2 to current transmission time t3 (time t3).

However, in the transmission processing in FIG. 6, in a case where a predetermined event has occurred from time t2 to time t3, the content of the captured image is updated. Therefore, background images from before and after the detection of the event are used in a mixed manner, and thus, there is a possibility that the content of the flow line analysis image is not accurate.

Therefore, in FIG. 7, when the notification of the detection of the predetermined event (for example, the change of the layout in the sales area on floor 1 in store AA) is received from event information receiver 70 (time t3), transmitter 60 receives, for example, an event interruption from event information receiver 70, and acquires the background image data stored in background image accumulator 80 and the data of the result of extracting the flow line information relating to the staying information or the passing information of the moving object stored in passing/staying analysis information accumulator 90 from previous transmission time t2 to time t3 when the event interruption is received, and then, transmits the data items to server device 300 (time t3). Furthermore, when the expiration time of the transmission period is reached and notified from schedule manager 50, transmitter 60 receives, for example, the timer interruption from schedule manager 50, and acquires the background image data stored in background image accumulator 80 and the data of the result of extracting the flow line information relating to the staying information or the passing information of the moving object stored in passing/staying analysis information accumulator 90 from time t3 when the event interruption is received to current transmission time t4, and then, transmits the data items to server device 300 (time t4).

In addition, in FIG. 8, even when the event interruption is received from event information receiver 70 at time t3, transmitter 60 refrains from transmitting the background image data stored in background image accumulator 80 and the data of the result of extracting the flow line information relating to the staying information or the passing information of the moving object stored in passing/staying analysis information accumulator 90 to server device 300 from previous transmission time t2 to time t3 when the event interruption is received (time t3). Furthermore, when the expiration time of the transmission period is reached and notified from schedule manager 50, transmitter 60 receives, for example, the timer interruption from schedule manager 50, and refrains from transmitting the background image data stored in background image accumulator 80 and the data of the result of extracting the flow line information relating to the staying information or the passing information of the moving object stored in passing/staying analysis information accumulator 90 to server device 300 from time t3 when the event interruption is received to time t4 (time t4).

In other words, in a case where the event interruption is received from event information receiver 70 at time t3, transmitter 60 refrains from transmitting the background image data stored in background image accumulator 80 and the data of the result of extracting the flow line information relating to the staying information or the passing information of the moving object stored in passing/staying analysis information accumulator 90 to server device 300 from previous transmission time t2 to a start time point (time t4 in FIG. 8) of the next transmission period after the reception of the event interruption (time t2 to time t4).

Furthermore, in FIG. 8, for example, when the timer interruption is received from schedule manager 50 (time t4), transmitter 60 restarts to transmit the background image data stored in background image accumulator 80 and the data of the result of extracting the flow line information relating to the staying information or the passing information of the moving object stored in passing/staying analysis information accumulator 90 to server device 300. Specifically, even though it is not illustrated in FIG. 8, when it becomes the expiration time of the transmission period notified from schedule manager 50 after time t4, transmitter 60 receives, for example, the timer interruption from schedule manager 50 and acquires the background image data stored in background image accumulator 80 and the data of the result of extracting the flow line information relating to the staying information or the passing information of the moving object stored in passing/staying analysis information accumulator 90 from time t4 to the current transmission time, and then, transmits the data items to server device 300.

Figure 9:
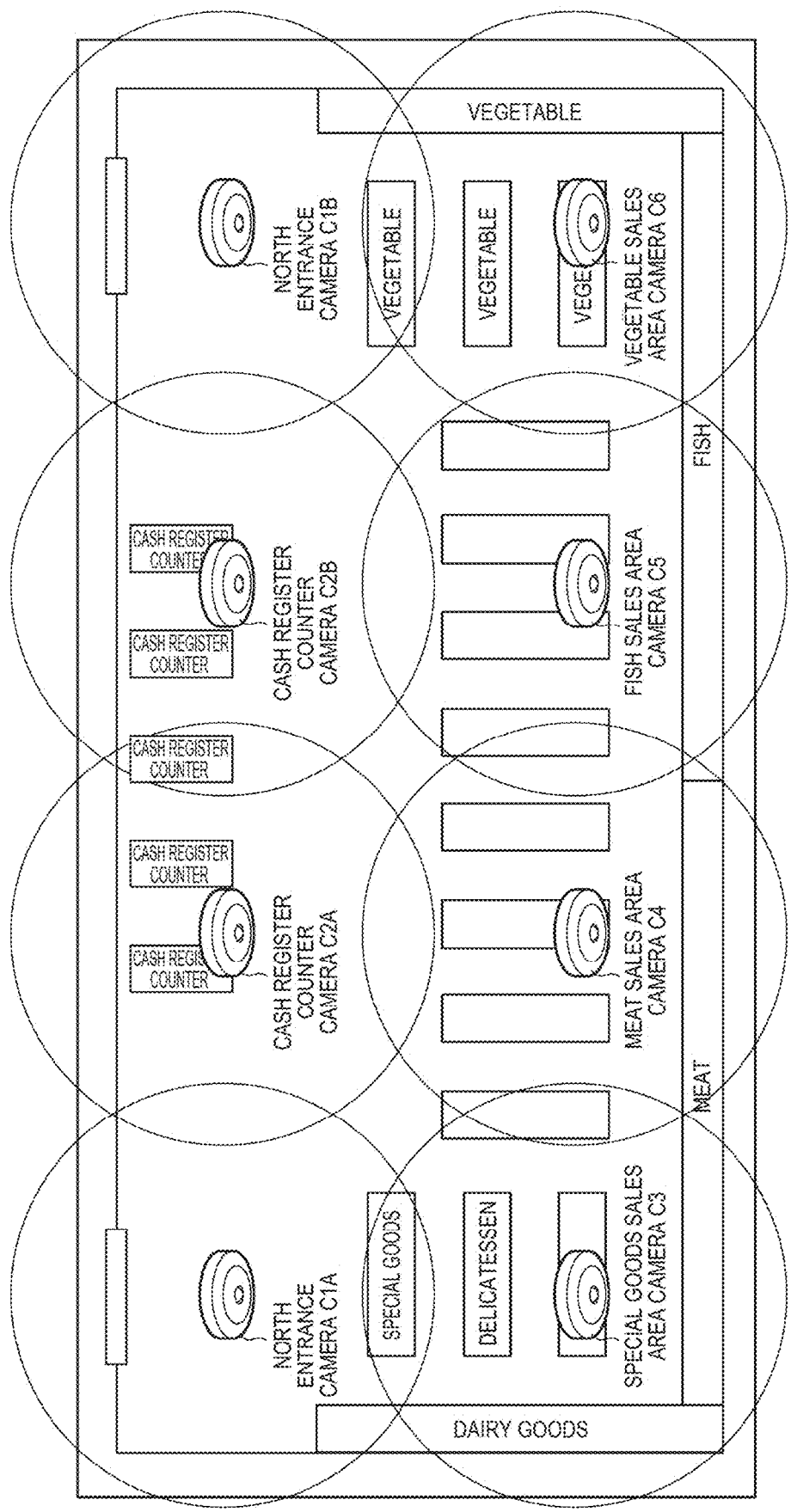
FIG. 9 is a diagram illustrating an example of a layout of a food sales area in which a plurality of camera devices in the present embodiment is installed.

FIG. 9 is a diagram illustrating an example of the layout of the food selling section in which a plurality of camera devices 100 in the present embodiment is installed. In FIG. 9, a situation is illustrated, in which, for example, a plurality of camera devices (for example, eight camera devices) is installed on a ceiling or the like of floor 1 in the food sales area on floor 1 (1F) in store AA. Specifically, a total eight of camera devices (for example, omni-directional camera devices) of north entrance cameras C1A and C1B, cash register cameras C2A and C2B, special goods sales area camera C3, meat sales area camera C4, seafood sales area camera C5, and vegetable sales area camera C6 are installed. The type of the camera devices is not limited to the omni-directional camera device, but a fixed camera device in which a fixed angle of view is set or a pan-tilt-zoom (PTZ) camera device having functions of panning, tilting and zooming may also be used.

Figure 10:
FIG. 10 is a diagram illustrating a first example of an operation screen including the flow line analysis image of store AA generated by a display image generator in a server device in the present embodiment.
Figure 11:
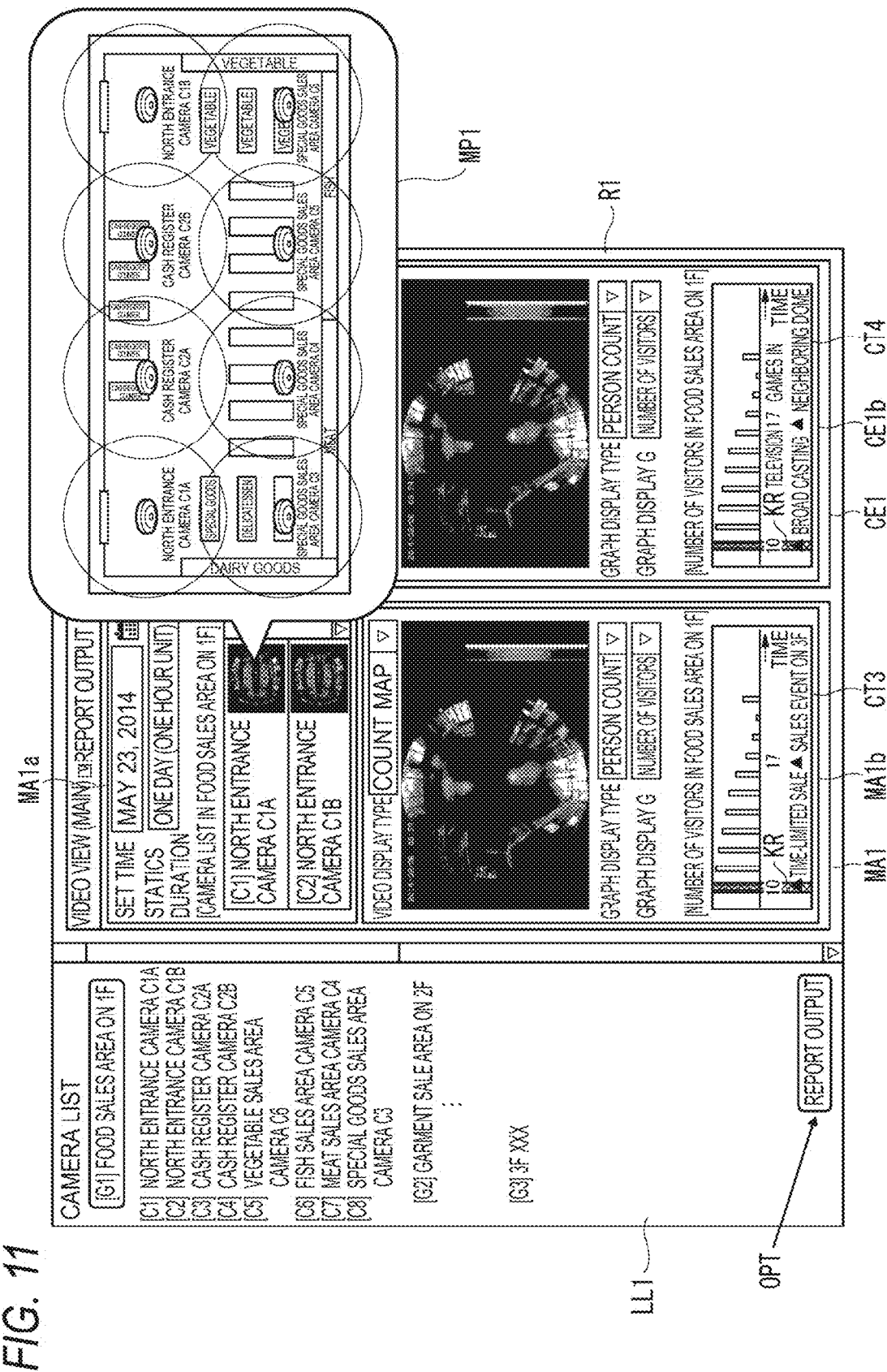
FIG. 11 is a diagram illustrating a second example of an operation screen including the flow line analysis image of store AA generated by the display image generator in the server device in the present embodiment.

FIG. 10 is a diagram illustrating a first example of an operation screen including the flow line analysis image of store AA generated by display image generator 350 in server device 300 in the present embodiment. FIG. 11 is a diagram illustrating a second example of an operation screen including the flow line analysis image of store AA generated by display image generator 350 in server device 300 in the present embodiment. The operation screen illustrated in FIG. 10 and FIG. 11 is displayed on monitor 450 by display image generator 350.

In the operation screen illustrated in FIG. 10, a list of a selection screen of the camera devices installed in the store is hierarchically indicated on left side display area L1. For example, in the food sales area on floor 1 (1F) (identification number: G1), north entrance camera C1A (identification number: C1), north entrance camera C1B (identification number: C2), cash register camera C2A (identification number: C3), cash register camera C2B (identification number: C4), vegetable sales area camera C6 (identification number: C5), seafood sales area camera C5 (identification number: C6), meat sales area camera C4 (identification number: C7), special goods sales area camera C3 (identification number: C8) are hierarchically indicated. Situations in a garment sale area and sale areas of other goods on floor 2 (2F) are similar, and thus, the description thereof will be omitted.

In addition, in the operation screen illustrated in FIG. 10, display area MA1 for the main flow line analysis information (for example, current) and display area CE1 for the sub-flow line analysis information (for example, for the comparison) are displayed on right side display area R1.

Display area MA1 for displaying the flow line analysis information includes specified condition display area MA1a that includes a designated time (including date, month, and year) when server device 300 generated the flow line analysis image of a viewing target, a statistical duration indicating, for example, the unit of half a day, a day, a week, or a month, and the selection screen of the camera device for each sales area selected in display area L1, and flow line analysis result display area MA1b that includes a video display type of the flow line analysis image, a graph display type, graph display G (group), and display area CT1 for displaying the number of visiting customers for each sales area.

The video display type of the flow line analysis image includes a staying map on which the staying information of the moving object (for example, the person) illustrated in FIG. 10 is indicated, a count map on which the passing information of the moving object (for example, the person) illustrated in FIG. 11 is indicated, and the captured image itself. On display area CT1 for displaying the number of visiting customers in each sales area, the number of the moving objects (for example, the persons) detected by person counter CT in time series (for example, every hour in FIG. 10 and FIG. 11) is indicated. For example, by the input operation of the user, when input device 400 shifts selection bar KR indicated on display area CT1 for displaying the number of visiting customers in each sales area in the direction of time axis, display image generator 350 displays the flow line analysis images generated at the time indicated by selection bar KR in an order.

As illustrated in FIG. 11, instead of the selection screen of the camera device for each sales area on display area MA1 for displaying the flow line analysis information, an example of layout MP1 in which a plurality of camera devices illustrated in FIG. 9 is installed in each sales area may be displayed.

In addition, similarly, display area CE1 for displaying the sub-flow line analysis information includes specified condition display area CE1a that includes a designated time (including date, month, and year) when server device 300 generated the flow line analysis image of a viewing target as a target comparison with the display area MA1 for displaying the main flow line analysis information, a statistics duration indicating, for example, the unit of half a day, a day, a week, or a month, and the selection screen of the camera device for each sales area selected in display area MA1 for displaying the main flow line analysis information, and flow line analysis result display area CE1b that includes a video display type of the flow line analysis image, a graph display type, graph display G (group), and display area CT2 for displaying the number of visiting customers for each sales area. In a case using display area CE1 for displaying the sub-flow line analysis information, usages of a comparison between before and after a discount seal is affixed on the products, a comparison between before and after the time-limited sale, a comparison between today and the same day last year, a comparison between the stores (for example, a comparison between a meat sales area in store AA and a meat sales area in store BB) may be included besides the comparison between, for example, before and after the change of the layout in the store.

On display area CT2 for displaying the number of visiting customers in each sales area, the number of the moving objects (for example, the persons) detected by person counter CT in time series (for example, every hour in FIG. 10 and FIG. 11) is indicated. For example, by the input operation of the user, when input device 400 shifts selection bar KR indicated on display area CT2 for displaying the number of visiting customers for each sales area in the direction of time axis, display image generator 350 reproduces and displays the flow line analysis images generated at the time indicated by selection bar KR in an order.

In addition, in display area CT1 for displaying the number of visiting customers in each sales area on display area MA1 for displaying the main (for example, current) flow line analysis information and in display area CT2 for displaying the number of visiting customers in each sales area on display area CE1 for displaying the sub-flow line analysis information (for example, comparison examples), it is possible to input a comment (for example, a time-limited sale, sales event on 3F, a television broadcast, and sports events taking place at neighboring domes, or the like) while designating specific times on the time axis by a user's input operation of input device 400.

In FIG. 11, the video display type is a count map, and the description on others is similar to those in FIG. 10, and thus, detailed descriptions thereof will be omitted. In FIG. 11 also, similar to FIG. 10, for example, when input device 400 shifts selection bar KR indicated on display areas CT3 and CT4 for displaying the number of visiting customers in each sales area in the direction of time axis by the input operation of the user, display image generator 350 reproduces and displays the flow line analysis images generated at the time indicated by selection bar KR in an order.

Figure 12:
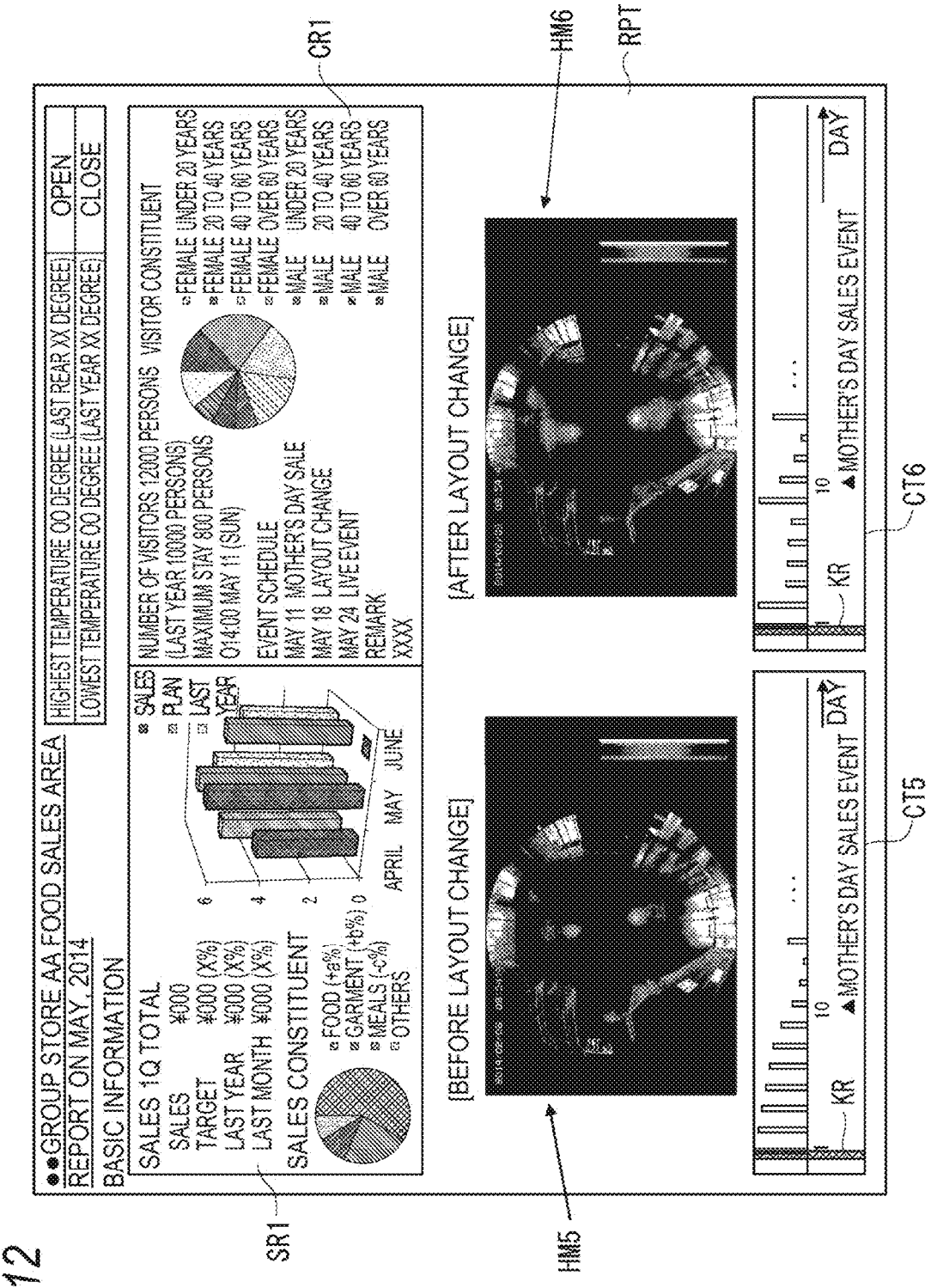
FIG. 12 is a diagram illustrating an example of an operation screen of a monthly report of the food sales area in store AA on May, 2014 generated by a report generation and output unit in the server device in the present embodiment.

FIG. 12 is a diagram illustrating an example of operation screen RPT of a monthly report of the food sales area in store AA on May, 2014 generated by report generation and output unit 360 in server device 300 in the present embodiment. The monthly report (refer to FIG. 12) as an example of a flow line analysis report in the present embodiment is generated by report generation and output unit 360 when report output button OPT provided on the lower portion on left side display area L1 on the operation screen illustrated in FIG. 10 and FIG. 11 is pressed by input device 400, and then displayed on the screen of monitor 450. Report generation and output unit 360 in server device 300 may output the monthly report illustrated in FIG. 12 or partial information thereof (for example, a monthly report in the meat sales area in the food sales area) on a printer (not illustrated) installed in store AA. In this way, the clerk in store AA can receive a distributed print-out of the monthly report of, for example, all the food sales area and the meat sales area which is a part thereof, in which the content of the flow line analysis image is printed without the visitors appearing.

On operation screen RPT of the monthly report (flow line analysis report) illustrated in FIG. 12, various information items relating to a title of the monthly report, information relating to the temperature, display area SR1 relating to the sales information, display area CR1 relating to statistical information on the number of visiting customers in the store (for example, store AA), a display area for displaying each of flow line analysis images HM5 and HM6 generated by display image generator 350 in between before and after the occurrence of a change of the layout of the sales area as an example of the predetermined event, and display areas CT5 and CT6 for displaying the number of visiting customers in each sales area, are indicated. The various information items relating to a title of monthly reports, information relating to temperature, sales information, event information, information relating to the configuration of the visitors, and the like are transmitted to the server devices (for example, server device 300) in the corresponding stores (for example, store AA) from server device 600 in the management headquarters. The various information items relating to a title of monthly reports, information relating to temperature, sales information, event information, information relating to the configuration of the visitors, and the like may be stored in server device 300 in the store or a storage (not illustrated) in advance.

Even in operation screen RPT of the monthly report illustrated in FIG. 12, similar to those in FIG. 10 and FIG. 11, for example, by the input operation of the user, when input device 400 shifts selection bar KR indicated on display areas CT5 and CT6 for displaying the number of visiting customers in each sales area in the direction of time axis, display image generator 350 displays the flow line analysis images generated at the time indicated by selection bar KR in an order.

As described above, in flow line analysis system 500A in the present embodiment, camera device 100 generates a background image of a captured image in a predetermined imaging area, extracts flow line information relating to the staying position or the passing position of a moving object (for example, a person) included in the captured image in an imaging area, and transmits the background image of the captured image and the flow line information of the moving object to server device 300 for each transmission period. Server device 300 generates a flow line analysis image in which the flow line information of the moving object is superimposed on the background image of the captured image, and then, displays this flow line analysis image on monitor 450.

In this way, flow line analysis system 500A generates the background image which becomes the base of the flow line analysis image in such a manner that the moving object (for example, the person) is eliminated so as not to appear in the image. Therefore, when generating the flow line analysis image, it is possible to appropriately protect the privacy of the moving object (the person) that appears in the imaging area. In addition, flow line analysis system 500A superimposes the flow line information relating to the staying position or the passing position in the imaging area of the moving object (the person) on the background image updated at the time point of predetermined timing (for example, when the periodic transmission period comes). Therefore, for every predetermined transmission period, it is possible to visually display the flow line analysis image that appropriately indicates the accurate flow line information relating to the staying position or the passing position of the moving object in the imaging area to the user in a state in which the moving object is eliminated from the captured image.

In addition, in flow line analysis system 500A, schedule manager 50 in the camera device notifies of a predetermined transmission period for transmitting the background image and the flow line information of the moving object. Therefore, it is possible to periodically transmit the background image and the flow line information of the moving object to server device 300 according to the transmission period notified in advance.

In addition, when a notification of detection of a predetermined event (for example, an event of changing a layout of a sales area in a store) is acquired by event information receiver 70, flow line analysis system 500A transmits the background image and the flow line information of the moving object to server device 300. Therefore, in server device 300, it is possible to generate a flow line analysis image in which the flow line information relating to the staying position or the passing position of the moving object in the imaging area before and after the time point when a specific event is detected, is accurately reflected.

In addition, when a change in the captured image (for example, the change of the layout of the sales area in the store) is detected by scene identifier SD, flow line analysis system 500A transmits the background image and the flow line information of the moving object to server device 300. Therefore, in server device 300, it is possible to generate a flow line analysis image in which the flow line information relating to the staying position or the passing position of the moving object in the imaging area before and after the time point when the change of the captured image is detected is accurately reflected.

In addition, flow line analysis system 500A counts the number of detected moving objects included in the captured image by person counter CT and outputs the information relating to the number of detected moving objects to transmitter 60. Therefore, it is possible to display the flow line analysis image including the information relating to the staying position or the passing position of the moving object in the imaging area and a display screen (operation screen) including the number of detected moving objects on monitor 450.

In addition, flow line analysis system 500A refrains from transmitting the background image and the flow line information of the moving object during the transmission period including the time point when the notification that the predetermined event is detected is acquired by event information receiver 70. Therefore, when the flow line analysis image is generated in server device 300, it is possible to prevent the flow line information items relating to the staying position or the passing position of the moving object in the imaging area before and after the predetermined event (for example, the change of the layout of the sales area in the store) from being used in a mixed manner.

In addition, flow line analysis system 500A generates a flow line analysis report that includes a flow line analysis image generated before the detection of the predetermined event (for example, the change of the layout of the sales area in the store) and the flow line analysis image generated after the detection of the predetermined event by report generation and output unit 360. Therefore, it is possible to indicate what changes of the flow line information, relating to the staying position or the passing position of the moving object, are present in the imaging area due to the predetermined event in an easy-to-understandable manner with contrast.

In addition, flow line analysis system 500A displays the generated flow line analysis report on monitor 450 by a predetermined input operation (for example, an operation of pressing a report output button by the user). Therefore, it is possible to visually display the flow line analysis report for the user.

Furthermore, flow line analysis system 500A causes each camera device 100, 100A, . . . , 100N to generate the background image of the captured image and to extract the flow line information relating to the staying position or the passing position of the moving object included in the captured image, and then, to generate and display the flow line analysis image in server device 300. Therefore, compared to a case of causing server device 300 to generate the background image of the captured image and to extract the flow line information relating to the staying position or the passing position of the moving object included in the captured image, a processing load to server device 300 can be reduced, and thus, it is possible to reduce the limitations of the number of camera devices connectable to one server device 300.

Modification Example in the Present Embodiment

In the present embodiment described above, the flow line analysis image generation processing is executed by server device 300. However, even the flow line analysis image generation processing may be executed by camera device 100 (refer to FIG. 13). FIG. 13 is a block diagram illustrating details of the functional and internal configurations of camera device 100S in a first modification example of the present embodiment. Camera device 100S illustrated in FIG. 13 is configured to include capture 10, image input unit 20, background image generator 30, flow line information analyzer 40, schedule manager 50, transmitter 60S, event information receiver 70, background image accumulator 80, passing/staying analysis information accumulator 90, and display image generator 350S. In the description for each part in camera device 100S illustrated in FIG. 13, the same reference signs will be given to the configurations and operations that are the same as camera device 100 illustrated in FIG. 2, descriptions thereof will be omitted and only the content different from those thereof will be described.

Display image generator 350S as an example of an image generator generates the flow line analysis image in which the flow line information relating to the staying position or the passing position of the moving object is superimposed on the background image using the background image data stored in background image accumulator 80 and the data of the result of extracting the flow line information relating to the staying information or the passing information of the moving object stored in passing/staying analysis information accumulator 90 according to the instruction from schedule manager 50 or event information receiver 70, and outputs the flow line analysis image to transmitter 60S.

Transmitter 60S transmits the flow line analysis image data generated by display image generator 350S to server device 300.

As described above, in the first modification example in the present embodiment, camera device 100S generates a background image of a captured image in a predetermined imaging area, extracts flow line information relating to a staying position or a passing position of a moving object (for example, a person) included in the captured image in an imaging area, and generates a flow line analysis image in which the flow line information of the moving object is superimposed on the background image of the captured image using the background image of the captured image and the flow line information of the moving object.

In this way, camera device 100S generates the background image which becomes the base of the flow line analysis image in such a manner that the moving object (for example, the person) is eliminated so as not to be reflected. Therefore, when generating the flow line analysis image, it is possible to appropriately protect the privacy of the moving object (the person) reflected in the imaging area. In addition, camera device 100S superimposes the flow line information relating to the staying position or the passing position in the imaging area of the moving object (the person) on the captured image obtained in real time. Therefore, it is possible to generate the flow line analysis image that appropriately indicates the latest flow line information relating to the staying position or the passing position of the moving object in the imaging area to the user in a state in which the moving object is eliminated from the captured image.

In addition, camera device 100S executes the flow line analysis image generation processing until the data is generated, and then, transmits the flow line analysis image data which is a generation result to server device 300. Therefore, for example, in a state in which the processing load on server device 300 is significantly high, since server device 300 may be caused to not execute the flow line analysis image generation processing, it is possible to suppress the increase of the processing load on server device 300.

Figure 14:
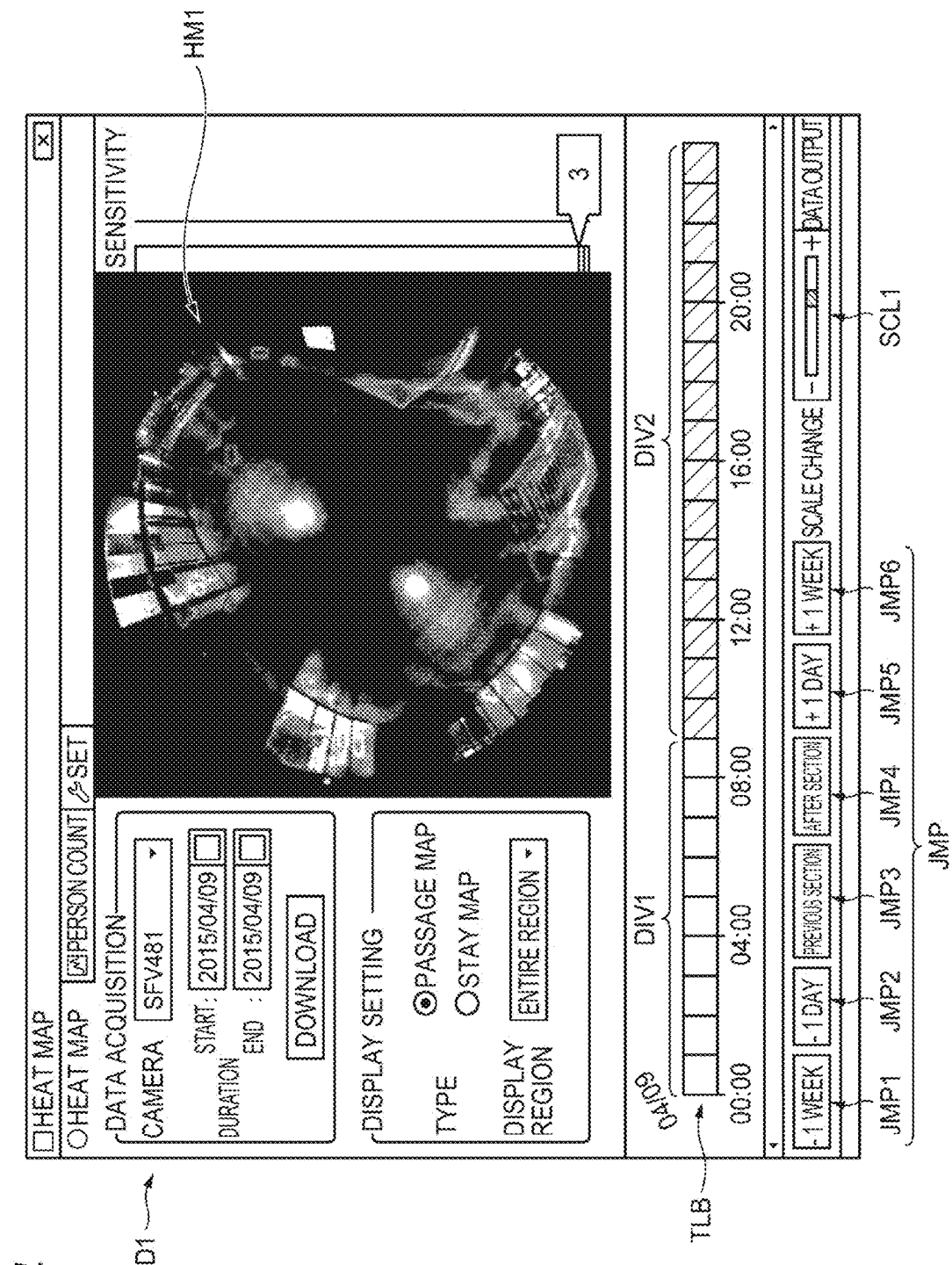
FIG. 14 is a diagram illustrating a third example of an operation screen including the flow line analysis image of store A generated by the display image generator in the server device in a second modification of the present embodiment.

In addition, when the operation screen including the generated flow line analysis image is displayed on monitor 450, server device 300 in a second modification of the present embodiment may display operation screen WD1 illustrated in FIG. 14 besides the operation screens illustrated in FIG. 10 and FIG. 11. FIG. 14 is a diagram illustrating a third example of an operation screen including the flow line analysis image of store AA generated by the display image generator 350 in server device 300 in a second modification of the present embodiment.

The following fields are displayed in operation screen WD1 illustrated in FIG. 14: an input field (dada acquisition filed) of the specified conditions for the data necessary for generating the flow line analysis image (that is, the background image data stored in background image accumulator 80 and the data of the result of extracting the flow line information relating to the staying information or the passing information of the moving object stored in passing/staying analysis information accumulator 90, and hereafter, referred to as "camera transmission data"), an input field (display setting field) of the setting items relating to the displaying of the flow line analysis image, flow line analysis image HM1, time line bar TLB, jump button JMP configured from a plurality of buttons, and scale change button SCL1.

In the data acquisition field, the identification number of the camera device which is a transmission source of the camera transmission data described above, and a starting date and an ending date of a target period (that is, a period during which the background image data and the data of the result of extracting the flow line information relating to the staying information or the passing information of the moving object are generated) of requesting the camera transmission data, are designated. When a download button is pressed, server device 300 receives to acquire the camera transmission data that matches the conditions specified in the data acquisition field from the corresponding camera device (for example, camera device 100), or acquires the data already received and accumulated in server device 300.

In the display setting field, any of a passage map (that is, an image in which the number of persons passing a specific place in the imaging area is visually indicated as a heat map) or a staying map (that is, an image in which a time during which a person stayed at a specific place is visually indicated as a heat map) is selected as a type of displaying the flow line analysis image. If necessary, among the flow line analysis image of the imaging area generated by display image generator 350, a region for displaying may be selected.

In time line bar TLB, for example, in a case where one day of "Apr. 9, 2015" is designated in the data acquisition field, the presence or absence of camera transmission data from the camera device is indicated for each time segment (hereafter, referred to as "scale"). That is, the presence or absence of the camera transmission data from the camera device for 24 hours in "Apr. 9, 2015" can be visually determined by the presence or absence of a total of 24 colors or design patterns in each cell of time line bar TLB. More specifically, in time range DIV1 (that is, a time range from 00:00 AM to 09:00 AM on Apr. 9, 2015), it is indicated that the camera transmission data from the camera device was not present, and in time range DIV2 (that is, a time range from 09:00 AM to 24:00 PM on Apr. 9, 2015), it is indicated that the camera transmission data from the camera device was present. In FIG. 14, a time segment (that is, one cell) corresponding to a scale indicates one hour.

The time segment corresponding to the scale (that is, one cell) can be easily changed by sliding scale change button SCL1 to the right or left direction. For example, in a case where the time segment corresponding to the scale (that is, one cell) indicates one cell, if the user operates input device 400 such as a mouse and slides scale change button SCL1 to the right or left direction, display image generator 350 changes the time segment corresponding to the scale (that is, one cell) to one day which is longer than one hour, and displays time line bar TLB again. Not limited to one day, the time segment longer than one hour may be arbitrarily changed to, for example, two hours. This change can be set according to the user's operation on the screen selected by a setting tab on operation screen WD1 illustrated in FIG. 14.

Similarly, for example, in a case where the time segment corresponding to the scale (that is, one cell) is indicated as one hour, if the user operates input device 400 such as the mouse and slides scale change button SCL1 to the right and left direction, display image generator 350 changes the time segment corresponding to the scale (that is, one cell) to 15 minutes which is shorter than one hour, and displays time line bar TLB again. Not limited to 15 minutes, the time segment longer than one hour may be arbitrarily changed to, for example, 30 minutes. This change can be set according to the user's operation on the screen selected by the setting tab on operation screen WD1 illustrated in FIG. 14.

In jump button JMP, – one week button JMP1, – one day button JMP2, front section button JMP3, back section button JMP4, + one day button JMP5, + one week button JMP6 are provided. However, jump button JMP is not limited to those six types of buttons. For example, the numbering portions of the "– one week button JMP1, – one day button JMP2, + one day button JMP5, + one week button JMP6" having numbers in the names of buttons can be arbitrarily changed by the user's operation on a setting screen which is not illustrated (for example, the screen selected by the setting tab on operation screen WD1 illustrated in FIG. 14).

For example, in a case where the camera transmission data from the current time to a point in time which occurred a week ago is acquired from the camera device, when – one week button JMP1 is pressed by the user's operation, display image generator 350 switches flow line analysis image HM1 displayed at the time of pressing to the flow line analysis image generated one week before the above-described flow line analysis image, and displays the flow line analysis image on monitor 450.

Figure 17:
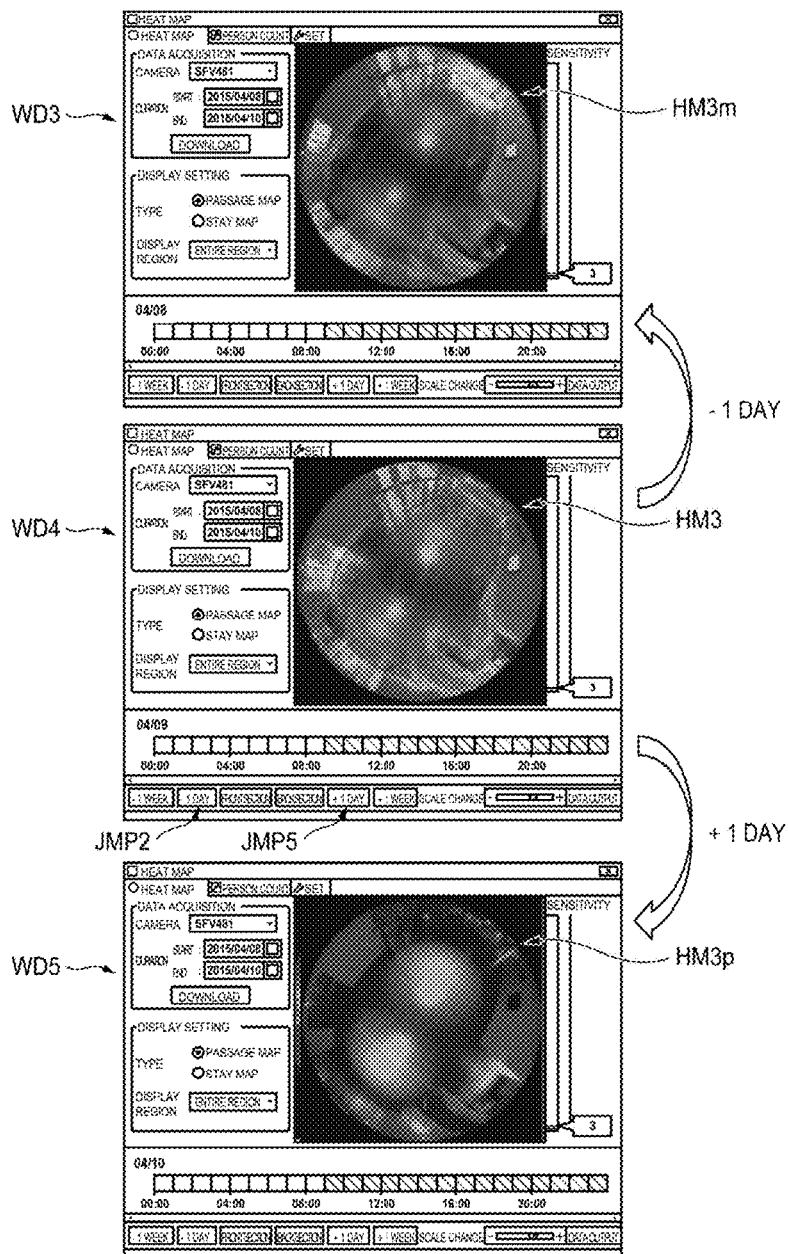
FIG. 17 is a diagram describing an example of a switched display of the flow line analysis images corresponding to pressing of a + one day button and a − one day button among jump buttons illustrated in FIG. 14.

For example, in a case where the camera transmission data up to the time point back to a week ago from the current time is acquired from the camera device, when – one day button JMP2 is pressed by the user's operation, display image generator 350 switches flow line analysis image HM1 displayed at the time of pressing to the flow line analysis image generated one day before the above-described flow line analysis image, and displays the flow line analysis image on monitor 450 (refer to FIG. 17).

For example, in a case where the camera transmission data up to the time point after one day from the current time is acquired from the camera device, when + one day button JMP5 is pressed by the user's operation, display image generator 350 switches flow line analysis image HM1 displayed at the time of pressing to the flow line analysis image generated one day after the above-described flow line analysis image, and displays the flow line analysis image on monitor 450 (refer to FIG. 17).

For example, in a case where the camera transmission data up to the time point after one week from the current time is acquired from the camera device, when + one week button JMP6 is pressed by the user's operation, display image generator 350 switches flow line analysis image HM1 displayed at the time of pressing to the flow line analysis image generated one week after the above-described flow line analysis image, and displays the flow line analysis image on monitor 450.

In addition, the generation time point (in other words, a time or time segment for starting the jump) of the camera transmission data which is the base of the flow line analysis image in a case where jump button JMP is pressed can be set according to the user's operation on the screen selected by the setting tab on operation screen WD1 illustrated in FIG. 14.

Figure 15:
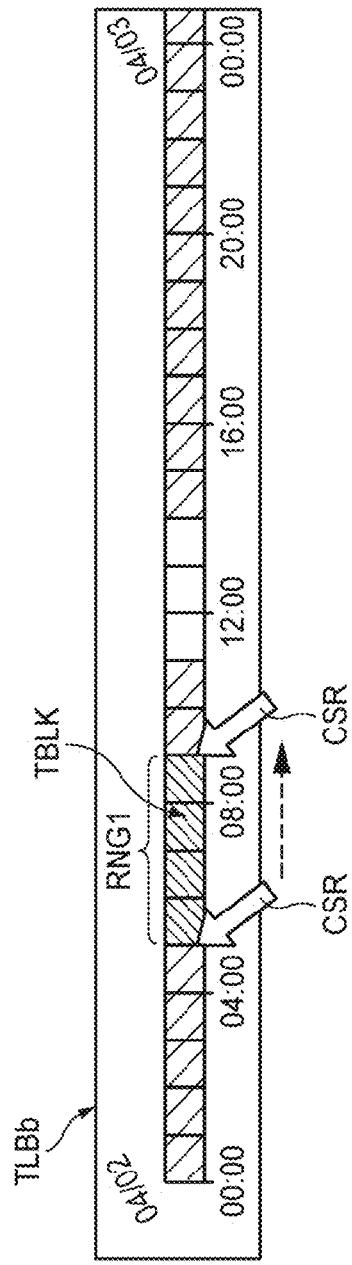
FIG. 15 is a diagram describing a first example of a timeline bar.

Before describing front section button JMP3 and back section button JMP4, a description regarding one section will be described with reference to FIG. 15. FIG. 15 is a diagram describing a first example of the timeline bar. In FIG. 15, for the convenience of the description, time line bar TLBb is illustrated which is different from time line bar TLB included in operation screen WD1 illustrated in FIG. 14.

In FIG. 15, the time segment corresponding to the scale (that is, one cell) is one hour similar to that in FIG. 14. The user can determine the presence or absence of the camera transmission data from the camera device by the colors or design patterns displayed on time line bar TLBb. In addition, by operating server device 300 or input device 400, the user can simply designate on time line bar TLBb whether the flow line analysis image of which time segment is displayed on monitor 450.

For example, the user operates input device 400 such as a mouse, and designates a position of cursor CSR on a cell of a starting time of designation target time segment RNG1 (for example, left click), and thereafter, drags cursor CSR up to an ending time of time segment RNG1, and then, releases the button of input device 400 such as the mouse at the position of ending the dragging (that is, ends the dragging). When the user's finger pressing the button of input device 400 such as the mouse is released at the position of ending the dragging, display image generator 350 fixes the starting time and the ending time of time segment RNG1. In this way, display image generator 350 displays the colors or design patterns of time segment RNG1 designated by the user's operation, which changes and is different from the colors or design patterns indicating the presence of the camera transmission data from the camera device (refer to FIG. 15).

For example, in time line bar TLBb illustrated in FIG. 15, time segment RNG1 is a time segment from 05:00 AM to 09:00 AM, on April 2, and the colors and design patterns corresponding to this time segment RNG1 were different from the colors and design patterns in the time segment from 00:00 AM to 11:00 AM and after 02:00 PM on April 2, during which the camera transmission data from the camera device was present. It is assumed that time line bar TLBb illustrated in FIG. 15 is in a state of being displayed so as to be included in operation screen WD1 illustrated in FIG. 14, that the flow line analysis image in this operation screen was generated using the camera transmission data for three days for example, and that the time segment corresponding to the scale (that is, one cell) is, for example, one hour. In this case, time line bar TLBb has a total length of cells equal to that of three days (that is, 24 hours×three days=72 cells). However, in a case where it is not possible to display all of the cells on the operation screen, display image generator 350 displays time line bar TLBb so as to be scrolled in the rightward and leftward direction. Therefore, in a case where the user wants to check whether or not the data transmitted from the camera is present at the date and time which are not displayed on time line bar TLBb, it is possible to easily check the presence by the scrolling operation of time line bar TLBb.

Display image generator 350, for example, treats time segment RNG1 described above with reference to FIG. 15 as one section, and when previous section button JMP3 among jump buttons JMP illustrated in FIG. 14 is pressed by the user's operation, switches flow line analysis image HM1 displayed at the time of pressing to the flow line analysis image generated at the time one section before flow line analysis image HM1 (for example, four hours corresponding to time segment RNG1) and displays the flow line analysis image on monitor 450.

On the other hand, display image generator 350, for example, treats time segment RNG1 described above with reference to FIG. 15 as one section, and when back section button JMP4 among jump buttons JMP illustrated in FIG. 14 is pressed by the user's operation, switches flow line analysis image HM1 displayed at the time of pressing to the flow line analysis image generated at the time one section after flow line analysis image HM1 (for example, four hours corresponding to time segment RNG1) and displays the flow line analysis image on monitor 450. As a result, an operator can compare one section with the other section in different time segment, then, can analyze flow line analysis image before and after an event and so on.

Figure 16:
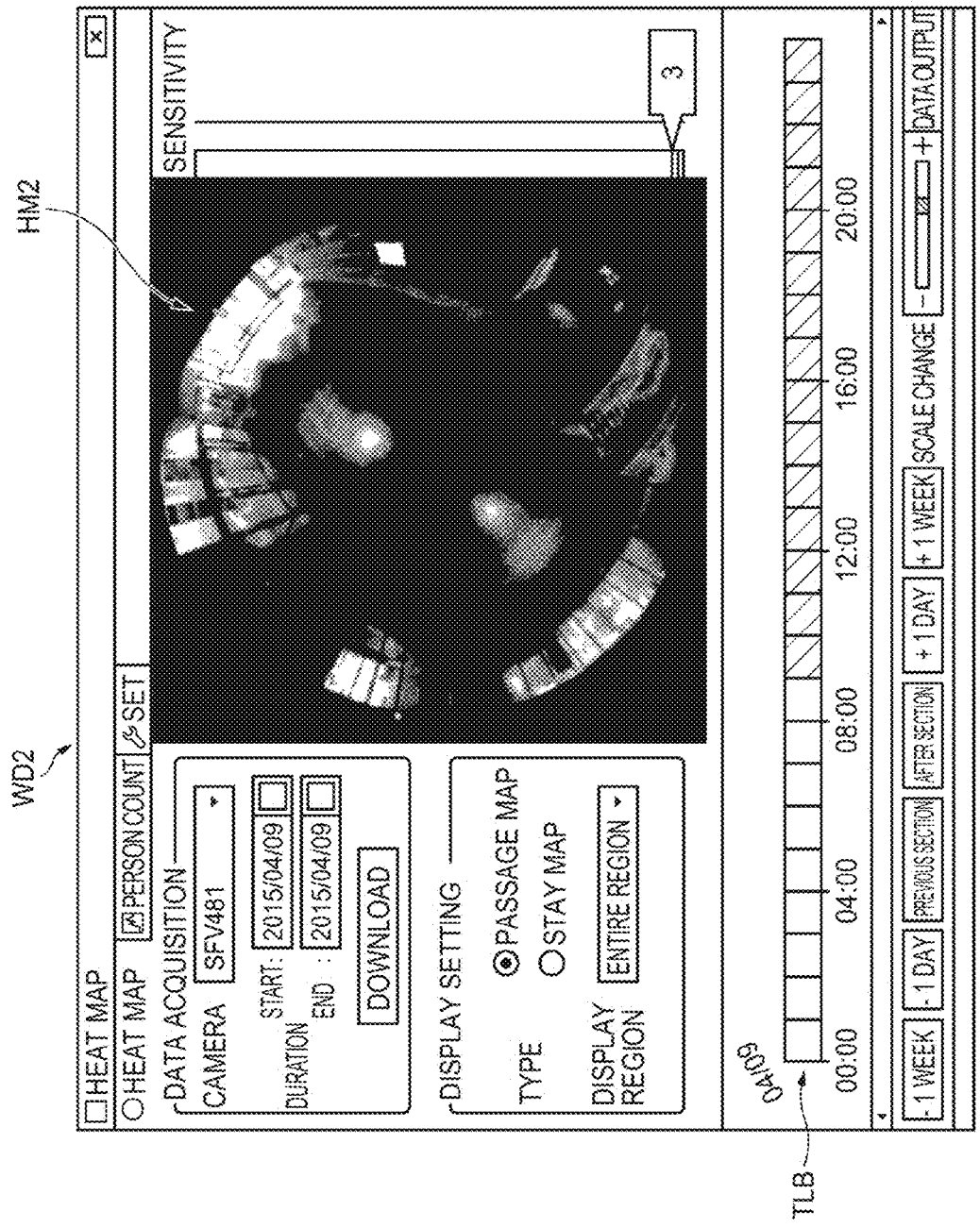
FIG. 16 is a diagram illustrating an example of an operation screen that includes the flow line analysis image of store AA corresponding to the designated time range after the change with respect to the timeline bar included in the operation screen illustrated in FIG. 14.

FIG. 16 is a diagram illustrating an example of operation screen WD2 that includes the flow line analysis image of store AA corresponding to the designated time range after the change with respect to timeline bar TLB included in operation screen WD1 illustrated in FIG. 14. In FIG. 16, the time range in time line bar TLB designated by the user is changed, and thus, flow line analysis image HM1 illustrated in FIG. 14 is switched to flow line analysis image HM2 corresponding to the time range after the change, and flow line analysis image HM2 is generated by display image generator 350 and is displayed on monitor 450.

In addition, after time segment TBLK (refer to time segment RNG1 illustrated in FIG. 15) corresponding to one section is defined by the designation operation of the user on time line bar TLB, time segment TBLK may be moved on time line bar TLB in a state in which time segment TBLK is temporarily fixed by the user performing the operation (for example, right click) of input device 400 such as the mouse with respect to defined time segment TBLK (in other words, in a state in which defined time segment TBLK is fixed on time line bar TLB). By this moving operation, display image generator 350 can generate the flow line analysis image corresponding to the time segment after the moving operation and display the image on monitor 450.

For example, in a case where the time segment before the moving operation is 09:00 AM to 01:00 PM and the time segment after the moving operation is 04:00 PM to 08:00 PM (lengths of both the time segments are four hours respectively), display image generator 350 switches operation screen WD2 including the flow line analysis image corresponding to the time segment 09:00 AM to 01:00 PM to another operation screen including the flow line analysis image corresponding to the time segment 04:00 PM to 08:00 PM, and displays the flow line analysis image on monitor 450.

FIG. 17 is a diagram describing an example of a switched display of the flow line analysis images corresponding to pressing of + one day button JMP5 and – one day button JMP2 among jump buttons JMP illustrated in FIG. 14. In FIG. 17, the start date in the data acquisition field is Apr. 8, 2015 and the end date is Apr. 10, 2015, and it is assumed that server device 300 acquired the data transmitted from the camera device for these three days and the current time is assumed to be Apr. 9, 2015.

For example, in a case where the data transmitted from the camera device is acquired up to the time point (Apr. 8, 2015) of one day back to the current time point (Apr. 9, 2015), when – one day button JMP2 is pressed, display image generator 350 switches flow line analysis image HM3 displayed at the time of pressing to flow line analysis image HM3$m$ generated one day before above-described flow line analysis image HM3, and displays the operation screen including flow line analysis image HM3$m$ on monitor 450.

In addition, in a case where the data transmitted from the camera device is acquired up to the time point (Apr. 10, 2015) of one day after the current time point (Apr. 9, 2015), when + one day button JMP5 is pressed, display image generator 350 switches flow line analysis image HM3 displayed at the time of pressing to flow line analysis image HM3$p$ generated one day after above-described flow line analysis image HM3, and displays the operation screen including flow line analysis image HM3$p$ on monitor 450 (refer to FIG. 17).

In this way, when generating the flow line analysis image, server device 300 in the second modification of the present embodiment can visually display the flow line analysis image that appropriately indicates the accurate flow line information relating to the staying position or the passing position of the moving object in the imaging area to the user in a state in which the moving object is eliminated from the captured image while appropriately protecting the privacy of the moving object (the person) which is reflected on the imaging area, and furthermore, the flow line analysis image is switched to the image generated at the different timing by a simple operation (pressing any button among jump buttons JMP) of the user and can be displayed, and thus, it is possible to improve the convenience (for example, convenience in checking the trend among the flow line analysis images) of the user.

Figure 19:
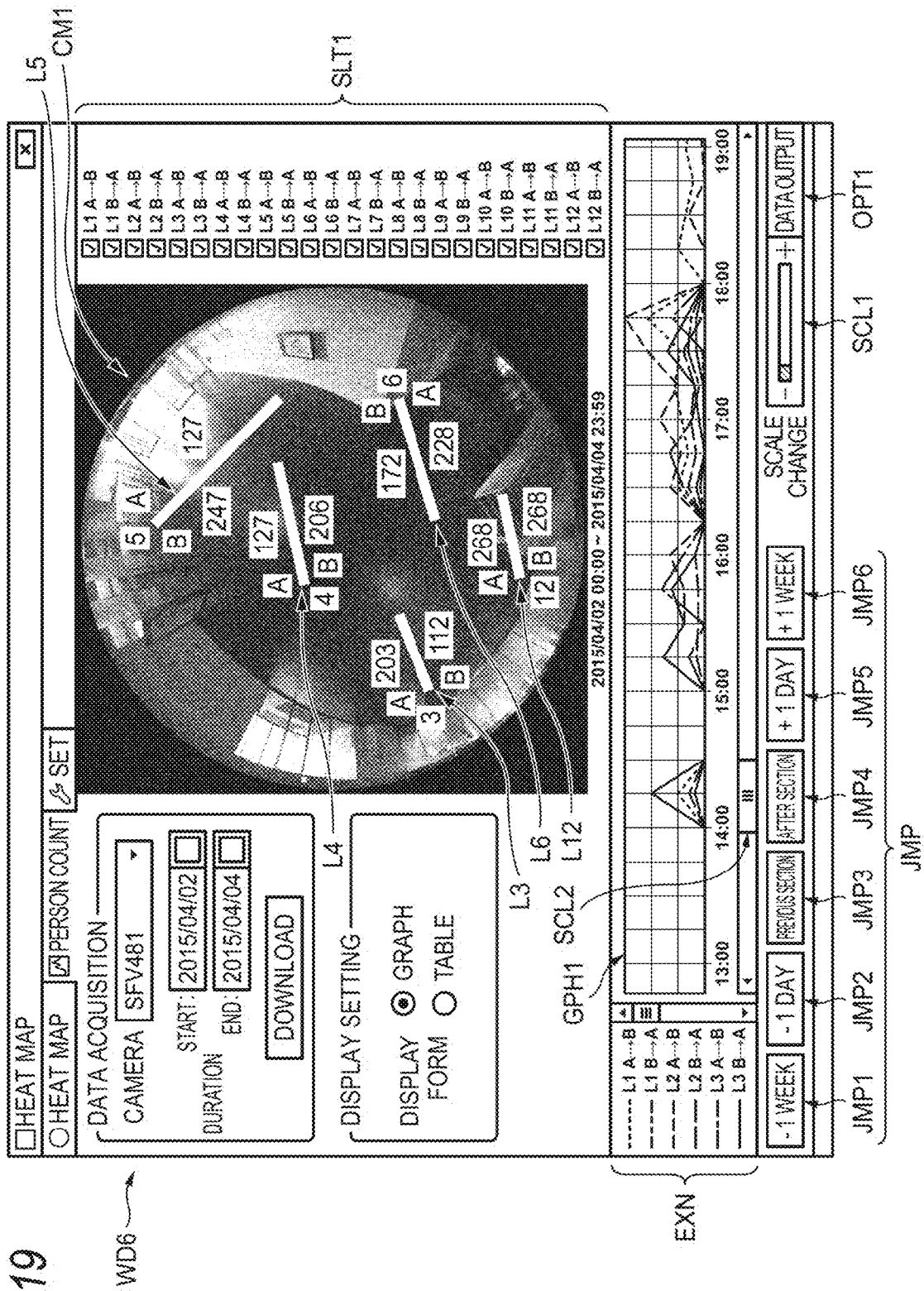
FIG. 19 is a diagram which illustrates a fourth example of an operation screen which includes a person counting map image of a store AA which is generated by a display image generation unit of the server device in the third modification example according to the embodiment.

In addition, a server device 300T in the third modification example according to the embodiment may display, for example, an operation screen WD6 which is illustrated in FIG. 19, in addition to the operation screen which is illustrated in FIGS. 10, 11, and 14, when displaying the operation screen on the monitor 450. FIG. 19 is a diagram which illustrates a fourth example of the operation screen which includes a person counting map image CM1 of the store AA which is generated by a display image generation unit 350T of the server device 300T in the third modification example according to the embodiment. On the operation screen WD6 which is illustrated in FIG. 19, the person counting map image CM1 as a count number image which denotes a count result of a moving object (for example, person) which straddles at least one pass line which is preset in each camera device provided in the store AA, for example, is displayed. The person counting map image CM1 is generated by using the display image generation unit 350T of the server device 300T.

For example, in a case in which a flow line analysis of a person in the store AA is performed using a flow line analysis system 500A, it is possible to perform a more detailed analysis when the number of moving objects which pass a portion to which a user pays attention such as a specific salesroom in the store AA, for example, can be grasped. For this purpose, in the third modification example according to the embodiment, at least one pass line is set to a position to which a user pays attention, and the server device 300T generates a person counting map image as an image which denotes the number of moving objects (for example, persons) which straddle the pass line, and displays the image on the monitor 450.

Figure 18:
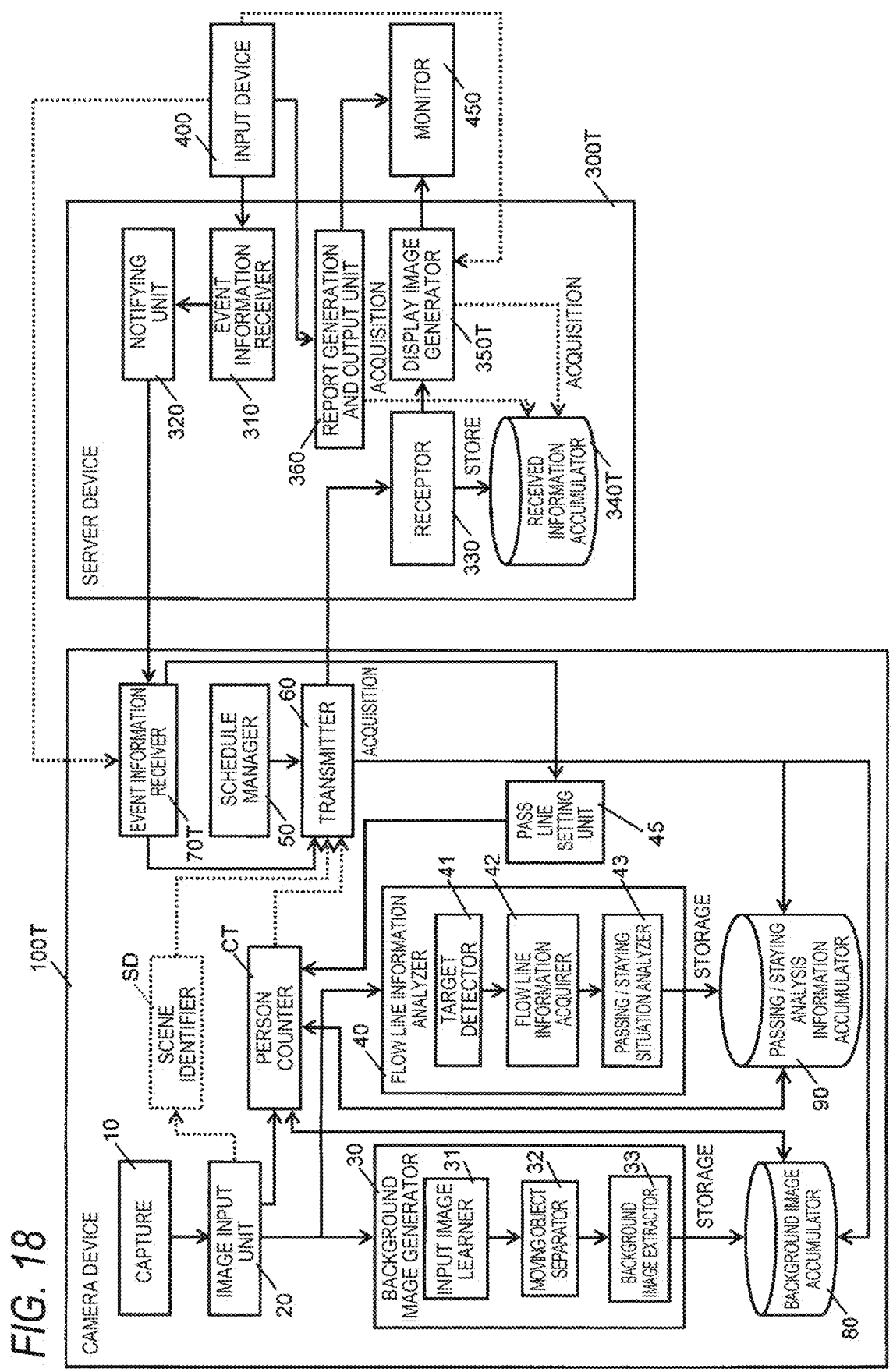
FIG. 18 is a block diagram which illustrates respective internal and functional configurations of a camera device and a server device in a third modification example according to the embodiment in detail.

FIG. 18 is a block diagram which illustrates respective internal and functional configurations of the camera device and the server device in the third modification example according to the embodiment in detail. When describing each unit of a camera device 100T and the server device 300T which are illustrated in FIG. 18, units with the same configuration and operation as those in the camera device 100 and the server device 300 which are illustrated in FIG. 2 will be given the same reference numerals, descriptions thereof will be omitted, and contents which are different from those will be described.

The camera device 100T is provided with a pass line setting unit 45, in addition to the configuration illustrated in FIG. 2. The pass line setting unit 45 is configured using, for example, a CPU, an MPU, or a DSP, and executes respective functions by executing processes according to a predetermined program. The pass line setting unit 45 sets a pass line for counting the number of moving objects at a designated position of a captured image or a background image when receiving a setting instruction of a pass line from the server device 300T or the input device 400, which is based on a user operation. The setting instruction of the pass line from the server device 300T or the input device 400, which is based on the user operation, is received in an event information reception unit 70T. Coordinate information which regulates a position of the pass line in a captured image or a background image, which is designated by a user is included in the setting instruction of the pass line.

The setting instruction of the pass line is generated in each camera device as a setting target of the pass line, and is transmitted to each corresponding camera device from the server device 300T or the input device 400. When receiving the setting instruction of the pass line, the event information reception unit 70T outputs the setting instruction to the pass line setting unit 45.

The pass line setting unit 45 outputs setting information of the pass line (for example, identification information of pass line, or coordinate information in captured image or background image of pass line) to the person counter CT. The person counter CT counts the cumulative number of moving objects which straddle the pass line which is set, based on data stored in the passing/staying analysis information accumulator 90 (that is, data of extraction result of flow line information related to staying information or passing information of moving object), and the setting information of the pass line which is handed over from the pass line setting unit 45. The person counter CT separately counts the number of moving objects which straddle the pass line in one direction, and the number of moving objects which straddle the pass line in a direction opposite the one direction, respectively. The person counter CT outputs a counted value of the moving objects which pass through the pass line (in other words, straddle) to the transmit unit 60 as a person count result. The transmit unit 60 transmits the person count result from the person counter unit CT to the server device 300T.

In the server device 300T, the person count result which is transmitted from the transmit unit 60 is accumulated in a received information accumulation unit 340T. The display image generation unit 350T generates an image which is obtained by superimposing various information related to the pass line on a captured image or a background image as a person counting map image which displays a count result of moving objects which straddle the pass line set in the captured image or the background image. Various information related to the pass line includes, for example, identification information of the pass line, an identifier of a position (position A or position B) which defines a direction of straddling the pass line, and the number of moving objects which straddle the pass line (in other words, count result).

In addition, in the third modification example according to the embodiment, it is described that the above described flow line information is not superimposed on the person counting map image; however, the flow line information may be superimposed on the person counting map image. In this case, in the person counting map image, a contour image which includes a moving object with only a contour or silhouette in which privacy information such as contents of an image of a person is removed may be used so that it is difficult to specify the person who appears in the captured image, instead of a captured image or a background image. In addition, a technology of generating a contour image from a captured image is a well-known technology, and is described in Japanese Patent Unexamined Publication No. 2015-149557, Japanese Patent Unexamined Publication No. 2015-149558, and Japanese Patent Unexamined Publication No. 2015-149559.

Hereinafter, a person counting map image will be described as an image which is generated by superimposing a person count result which is counted by the person counter CT on a background image which is generated by the background image generation unit 30 of the camera device 100T. However, as described above, the person counting map image may be generated by superimposing a person count result which is counted by the person counter CT on a captured image obtained by the image capturing unit 10 of the camera device 100T.

On the operation screen WD6 illustrated in FIG. 19, an input column (data obtaining column) of designation conditions of data which is necessary when generating a person counting map image (that is, data of background image stored in background image accumulation unit 80, and data of person count result derived by person counter CT), an input column (display setting column) of a setting item related to a display of time sequential transition of the person count result, the person counting map image CM1, a pass line sorting column SLT1, a pass line display column EXN, a time line bar GPH1, a scroll bar SCL2, jump buttons JMP which are formed of a plurality of buttons, a schedule changing button SCL1, and a data output button OPT1 are displayed. Hereinafter, data which is necessary when generating the person counting map image (that is, data of background image stored in background image accumulation unit 80, and data of person count result derived by person counter CT) will be referred to as "camera transmission data".

In the data obtaining column, an identification number of the camera device as a transmission source of the above described camera transmission data, and a start date and an end date of a period as a request object of the camera transmission data (that is, period in which data of background image and data of person count result of pass line are generated) are designated. When a download button is pressed, the server device 300T obtains camera transmission data which matches conditions designated in the data obtaining column by receiving the data from a corresponding camera device (for example, camera device 100T), or obtains data which is already received, and is accumulated in the server device 300T.

In the display setting column, a display method of a time sequential transition of the person count result is designated in the time line bar GPH1 which will be described later. When a "graph" button is pressed, as illustrated in the time line bar GPH1 in FIG. 19, the server device 300T time sequentially displays the person count result on the monitor 450 in a graphical form. Meanwhile, when a "table" button is pressed, the server device 300T time sequentially displays the person count result on the monitor 450 in a tabular form.

In the person counting map image CM1, a cumulative total of a count result of moving objects (for example, persons) which straddle respective pass lines L3, L4, L5, L6, and L12 from a position A toward a position B, or from the position B toward the position A, for example, is displayed by being superimposed on each pass line along with the positions A and B. For example, a cumulative total of persons who straddle the pass line L3 from the position A toward the position B is "203", and a cumulative total of persons who straddle the pass line L3 from the position B toward the position A is "112" between 00:00 on Apr. 2, 2015 and 23:59 on Apr. 4, 2015. Similarly, a cumulative total of persons who straddle the pass line L4 from the position A toward the position B is "127", and a cumulative total of persons who straddle the pass line L4 from the position B toward the position A is "206". A cumulative total of persons who straddle the pass line L5 from the position A toward the position B is "127", and a cumulative total of persons who straddle the pass line L5 from the position B toward the position A is "247". A cumulative total of persons who straddle the pass line L6 from the position A toward the position B is "228", and a cumulative total of persons who straddle the pass line L6 from the position B toward the position A is "172". A cumulative total of persons who straddle the pass line L12 from the position A toward the position B is "268", and a cumulative total of persons who straddle the pass line L12 from the position B toward the position A is "268".

In this manner, a user can set at least one pass line at an arbitrary position to which the user pay attention in a captured image of the camera device 100T, in an image capturing area of the camera device 100T which is provided in the store AA, for example. The server device 300T can denote flow line information in the image capturing area of a moving object (for example, customer) visually and quantitatively, by counting a cumulative total of persons who pass the pass line in a captured image or a background image which is set by a user operation in each passing direction thereof, and displaying the cumulative total of persons on the monitor 450 as the person counting map image CM1.

In the pass line sorting column SLT1, a pass line which is set based on a user operation with respect to a captured image or a background image of the camera device 100T is displayed in both directions of the direction from the position A to the position B, and the direction opposite thereto. Specifically, 12 pass lines of L1, L2, L3, L4, L5, L6, L7, L8, L9, L10, L11, and L12 are set by the user operation, and a total check boxes of 24 in the direction from the position A to the position B, and the direction from the position B to the position A is provided with respect to respective pass lines L1 to L12. In a case in which check markers are input to the check boxes, the server device 300T displays the person counting map image CM1 in which a person count result corresponding to a pass line and a pass direction to which a check marker is applied is superimposed on a captured image or a background image on the monitor 450. In the example illustrated in FIG. 19, check markers are input to all of the check boxes; however, in order to avoid complexity in FIG. 19, for example, the pass lines L3, L4, L5, L6, and L12, the positions A and B which define passing directions of the pass lines, and a person count result in each of passing directions are illustrated.

In the pass line display column EXN, all of the pass lines L1 to L12 which are denoted in the pass line sorting column SLT1, and types of colors which define setting with passing directions of the respective pass lines are displayed. In addition, since 24 pass lines in total and setting of passing methods are sorted in FIG. 19, only a direction from the position A to the position B of the pass line L1, a direction from the position B to the position A of the pass line L1, a direction from the position A to the position B of the pass line L2, a direction from the position B to the position A of the pass line L2, a direction from the position A to the position B of the pass line L3, and a direction from the position B to the position A of the pass line L3 are displayed, for example; however, a user can confirm a display color of another setting by performing an operation in the vertical direction using a scroll bar.

In the time line bar GPH1, in a case in which three days of "Apr. 2, 2015 to Apr. 4, 2015" are designated in the data obtaining column, for example, a person count result corresponding to pass lines and passing methods is time sequentially denoted for three days. However, in the time line bar GPH1 illustrated in FIG. 19 or 20, a time zone of one scale denotes 15 minutes, and a person count result of all time zones of three days is not displayed in a display size of the operation screen WD6 which is illustrated in FIG. 19. In this case, when the scroll bar SCL2 is caused to slide in the horizontal direction using a user operation, the server device 300T displays a person count result corresponding to the date or a time zone after being sled on the time line bar GPH1 using a graphical form. In addition, as described above, the time line bar GPH1 in the graphical form can be displayed by being switched to a time line bar in a tabular form by a user operation with respect to the display setting column.

A time zone of one scale of the time line bar GPH1 in the horizontal axis direction (that is, one cell) can be easily changed by using a sliding operation of the scale changing button SCL1 in the horizontal direction. For example, in a case in which a time zone corresponding to one scale denotes one hour, when a user caused the scale changing button SCL1 to slide in the right direction by operating the input device 400 such as a mouse, the display image generation unit 350T displays the time line bar GPH1 again by changing a time zone corresponding to one scale to one day which is larger than one hour, for example. It is possible to arbitrarily change a time zone corresponding to one scale to two hours, for example, without limiting a time zone larger than one hour to one day. This change can be set on a screen on which a setting tab of the operation screen WD6 which is illustrated in FIG. 19, for example, is selected according to a user operation.

Similarly, for example, in a case in which a time zone corresponding to one scale denotes one hour, when a user caused the scale changing button SCL1 to slide in the left direction by operating the input device 400 such as a mouse, the display image generation unit 350T displays the time line bar GPH1 again by changing a time zone corresponding to one scale to 15 minutes, for example, which is shorter than one hour. It is possible to arbitrarily change a time zone to 30 minutes, for example, without limiting the time zone which is shorter than one hour to 15 minutes. This change can be set on a screen on which the setting tab of the operation screen WD6 which is illustrated in FIG. 19, for example, is selected according to a user operation.

Since the jump button JMP which is formed of six buttons is the same as the jump button JMP of the operation screen WD1 illustrated in FIG. 14, descriptions of respective buttons will be omitted.

For example, in a case in which camera transmission data from the camera device 100T, from the present time to a point of time which goes back one week is obtained, when −1 week button JMP1 is pressed by a user operation, the display image generation unit 350T displays a person counting map image which is generated one week before generating of a person counting map image on the monitor 450, by switching the person counting map image which is displayed in the point of time in which the button is pressed to the image generated one week before.

Figure 21:
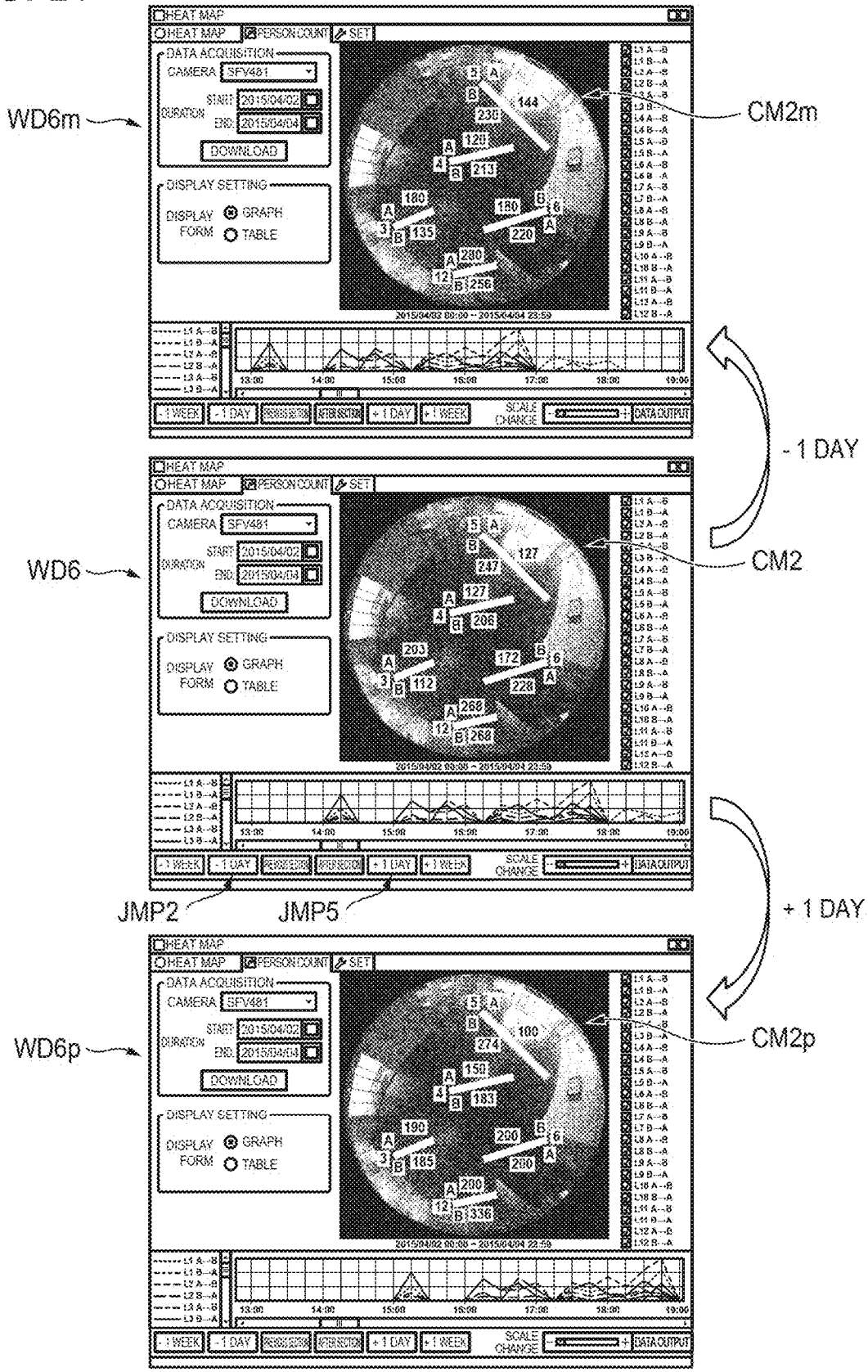
FIG. 21 is an explanatory diagram which illustrates a display example in which a person counting map image is switched corresponding to pressing of a +1 day button or a −1 day button in the jump buttons illustrated in FIG. 19.

For example, in a case in which camera transmission data from the camera device 100T, from the present time to a point of time which goes back one day is obtained, when −1 day button JMP2 is pressed by a user operation, the display image generation unit 350T displays a person counting map image CM2m which is generated one day before generating of the person counting map image CM2 on the monitor 450, by switching the person counting map image CM2 which is displayed in the point of time in which the button is pressed to the image CM2m (refer to FIG. 21).

For example, in a case in which camera transmission data from the camera device 100T, from the present time to a point of time in which one day passed is obtained, when the +1 day button JMP5 is pressed by a user operation, the display image generation unit 350T displays a person counting map image CM2p which is generated one day after generating of the person counting map image CM2 on the monitor 450, by switching the person counting map image CM2 which is displayed in the point of time in which the button is pressed to the image CM2p (refer to FIG. 21).

For example, in a case in which camera transmission data from the camera device 100T, from the present time to a point of time in which one week passed is obtained, when the +1 week button JMP6 is pressed by a user operation, the display image generation unit 350T displays a person counting map image which is generated one week after generating of a person counting map image on the monitor 450, by switching the person counting map image which is displayed in the point of time in which the button is pressed to the image generated one week after.

In addition, a point of generation time of camera transmission data as the source of a person counting map image in a case in which the jump button JMP is pressed (in other words, time or time zone as starting point of jump) can be set on a screen on which a setting tab of the operation screen WD6 which is illustrated in FIG. 19, for example, is selected according to a user operation.

Figure 20:
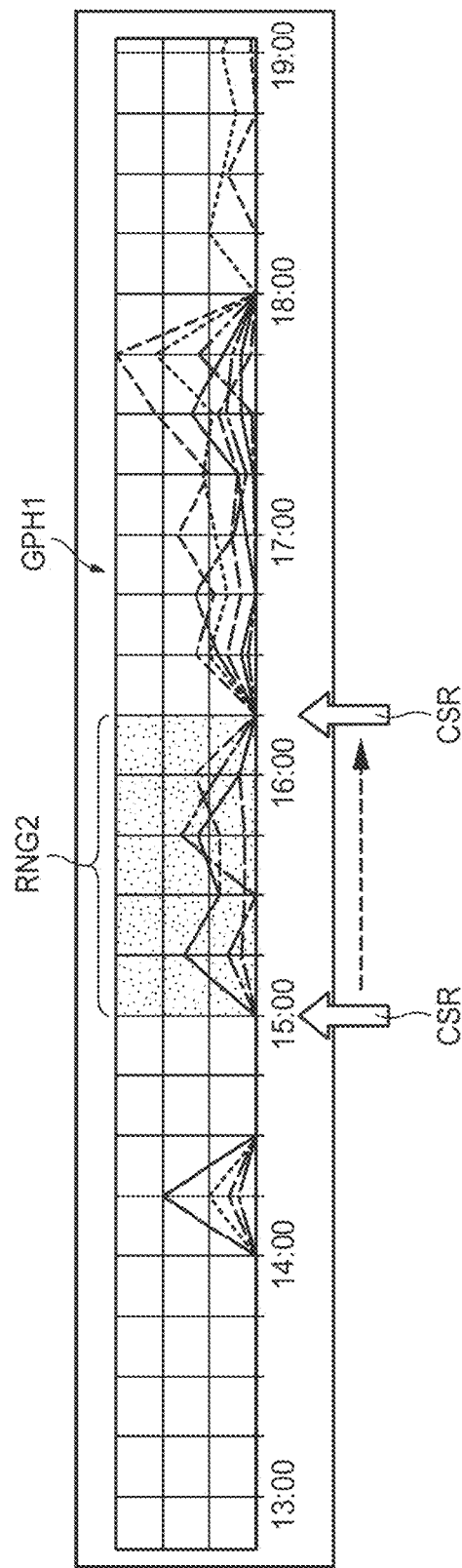
FIG. 20 is an explanatory diagram of a second example of a time line bar.

One section will be described with reference to FIG. 20 before describing the previous section button JMP3 and the rear section button JMP4. FIG. 20 is an explanatory diagram of a second example of the time line bar.

In FIG. 20, a time zone corresponding to one scale is set to 15 minutes, similarly to that in FIG. 19. A user can simply designate a person counting map image of which time zone to be displayed on the monitor 450 on the time line bar GPH1, using an operation with respect to the server device 300T or the input device 400.

For example, a user designates a cursor CSR on a cell of a starting time of a time zone RNG2 as a designation target, by operating the input device 400 such as the mouse (for example, left-click), drags the cursor CSR to an ending time of the time zone RNG2, and release a button of the input device 400 such as the mouse at a dragging ending position (that is, ends dragging). When releasing a finger of a user which presses the button of the input device 400 such as the mouse at the dragging ending position, the display image generation unit 350T determines a starting time and an ending time of the time zone RNG2. In this manner, the display image generation unit 350T displays a color or a pattern of the time zone RNG2 which is designated using a user operation by changing the color or the pattern to a color which is different from a background color (for example, white color) of the time line bar (for example, orange color), or a different pattern (refer to FIG. 20).

In the time line bar GPH1 illustrated in FIG. 20, a time zone from 12:45 to 19:00 on Apr. 2, 2015, for example, is denoted, and the time zone RNG2 which is designated by a user operation denotes 1 hour and 15 minutes (that is, time zone of five scales) from 15:00 to 16:15 on Apr. 2, 2015. When the period of time from 15:00 to 16:15 on Apr. 2, 2015 is designated in the time line bar GPH1, for example, by a user operation, the server device 300T displays a background color of the period of time by changing a color, and displays a person counting map image in the period on the monitor 450 by switching to the image.

In this manner, a user can grasp a person count result in a selected time zone, visually and quantitatively, using a person counting map image by locally selecting only the time zone which he cares about.

The display image generation unit 350T treats the time zone RNG2 which is described with reference to FIG. 20, for example, as one section, and when the previous section button JMP3 in the jump buttons JMP illustrated in FIG. 19 is pressed by a user operation, a person counting map image which is generated before one section (for example, one hour and 15 minutes corresponding to time zone RNG2) of a person counting map image is displayed on the monitor 450, by switching the person counting map image which is displayed in a point of time in which the button is pressed to the image generated before one section.

Meanwhile, the display image generation unit 350T treats the time zone RNG2 which is described with reference to FIG. 20 as one section, and when the rear section button JMP4 in the jump buttons JMP illustrated in FIG. 19 is pressed by a user operation, a person counting map image which is generated after one section (for example, one hour and 15 minutes corresponding to time zone RNG2) of a person counting map image is displayed on the monitor 450, by switching the person counting map image which is displayed in a point of time in which the button is pressed to the image generated after one section.

A data output button OPT1 can output the entire operation screen WD6 or the person counting map image CM1 which is illustrated in FIG. 19, for example, as image data, and store thereof. When the data output button OPT1 is pressed, the display image generation unit 350T of the server device 300T stores the operation screen WD6 or the person counting map image CM1 in the operation screen WD6 which is illustrated in FIG. 19, for example, in the received information accumulation unit 340T as image data. In addition, a data output button with the same function as that in the data output button OPT is also illustrated in FIGS. 14, 16, 17, and 21.

FIG. 21 is an explanatory diagram which illustrates a display example when switching the person counting map image CM2 corresponding to pressing of the +1 day button JMP5 and the −1 day button JMP2 in the jump buttons JMP illustrated in FIG. 19. In FIG. 21, it is assume that a starting day of a data obtained column is set to Apr. 2, 2015, an ending day is set to Apr. 4, 2015, camera transmission data from the camera device 100T in three days is obtained in the server device 300T, and the present time in descriptions in FIG. 21 is set to Apr. 3, 2015.

For example, in a case in which camera transmission data from the camera device 100T, from the present time (Apr. 3, 2015) to a point of time of one day before (Apr. 2, 2015) is obtained, when the −1 day button JMP2 is pressed, the display image generation unit 350T switches the person counting map image CM2 displayed in the point of time in which the button is pressed to the person counting map image CM2*m* which is generated one day before the person counting map image CM2, and displays the operation screen WD6*m* which includes the person counting map image CM2*m* on the monitor 450 (refer to FIG. 21).

Specifically, in a case in which switching of the person counting map image CM2 to the person counting map image CM2*m* is performed, a cumulative total of persons who straddle the pass line L3 from the position A to the position B between 00:00 on Apr. 2, 2015 and 23:59 on Apr. 4, 2015 is changed from "203" to "180", and a cumulative total of persons who straddle the pass line L3 from the position B to the position A is changed from "112" to "135". Similarly, a cumulative total of persons who straddle the pass line L4 from the position A to the position B is changed from "127" to "120", and a cumulative total of persons who straddle the pass line L4 from the position B to the position A is changed from "206" to "213". A cumulative total of persons who straddle the pass line L5 from the position A to the position B is changed from "127" to "144", and a cumulative total of persons who straddle the pass line L5 from the position B to the position A is changed from "247" to "230". A cumulative total of persons who straddle the pass line L6 from the position A to the position B is changed from "228" to "220", and a cumulative total of persons who straddle the pass line L6 from the position B to the position A is changed from "172" to "180". A cumulative total of persons who straddle the pass line L12 from the position A to the position B is changed from "268" to "256", and a cumulative total of persons who straddle the pass line L12 from the position B to the position A is changed from "268" to "280".

In addition, in a case in which camera transmission data from the camera device 100T, from the present time (Apr. 3, 2015) to a point of time in which one day passed (Apr. 4, 2015), for example, is obtained, when the +1 day button JMP5 is pressed, the display image generation unit 350T switches the person counting map image CM2 which is displayed in the point of time in which the button is pressed to a person counting map image CM2*p* which is generated one day after the person counting map image CM2, and displays an operation screen WD6*p* which includes the person counting map image CM2*p* on the monitor 450 (refer to FIG. 21).

Specifically, in a case in which the person counting map image CM2 is switched to the person counting map image CM2*p*, a cumulative total of persons who straddle the pass line L3 from the position A to the position B between 00:00 on Apr. 2, 2015 and 23:59 on Apr. 4, 2015 is changed from "203" to "190", and a cumulative total of persons who straddle the pass line L3 from the position B to the position A is changed from "112" to "125". Similarly, a cumulative total of persons who straddle the pass line L4 from the position A to the position B is changed from "127" to "150", and a cumulative total of persons who straddle the pass line L4 from the position B to the position A is changed from "206" to "183". A cumulative total of persons who straddle the pass line L5 from the position A to the position B is changed from "127" to "100", and a cumulative total of persons who straddle the pass line L5 from the position B to the position A is changed from "247" to "274". A cumulative total of persons who straddle the pass line L6 from the position A to the position B is changed from "228" to "200", and a cumulative total of persons who straddle the pass line L6 from the position B to the position A is changed from "172" to "200". A cumulative total of persons who straddle the pass line L12 from the position A to the position B is changed from "268" to "200", and a cumulative total of persons who straddle the pass line L12 from the position B to the position A is changed from "268" to "336".

In this manner, the server device 300T in the third modification example according to the embodiment can display a person counting map image which denotes the accurate number of passers of a pass line in an image capturing region of a moving object visually and quantitatively, with respect to a user in a state in which the moving object is excluded from a captured image while appropriately protecting a privacy of the moving object (person) which is reflected in the image capturing region, when generating a person counting map image. In addition, the server device 300T can perform displaying by switching to a person counting map image which is generated by using a person count result which is derived in a different period of time using a simple user operation (pressing any button in jump buttons JMP), and can improve convenience of a user (for example, convenience when checking transition of the number of persons who straddle position of pass line, in each passing direction).

In addition, the server device 300T in the third modification example according to the embodiment can also display, for example, a person counting map image corresponding to a passing direction which is selected by selecting any one of a direction which goes from the position A to the position B of the pass line L1 and a direction which goes from the position B to the position A of the pass line L1, in the pass line sorting column SLT1 of the operation screen WD6 which is illustrated in FIG. 19. In this manner, it is possible for a user to quantitatively grasp the number of persons who go toward a passing direction to which the user pay attention (for example, direction of entrance of store).

In addition, the server device 300T in the third modification example according to the embodiment can also display, for example, a person counting map image corresponding to a passing direction which is selected by selecting both of the direction which goes from the position A to the position B of the pass line L1 and the direction which goes from the position B to the position A of the pass line L1, in the pass line sorting column SLT1 of the operation screen WD6 illustrated in FIG. 19. In this manner, it is possible for a user to quantitatively grasp the number of persons who go toward a passing direction to which the user pay attention (for example, both of direction of entrance of store and direction opposite thereto), and to grasp a statistic difference in the number of passers in each passing direction.

This application is based on Japanese Patent Application No. 2015-085454 filed on Apr. 17, 2015, and contents thereof are incorporated in this application as a reference.

What is claimed is:

1. A flow line analysis system in which a camera device and a server device are connected to each other,
wherein the camera device:
generates a captured image,
extracts flow line information relating to a staying position or a passing position of a moving object, and
transmits the generated captured image and the extracted flow line information of the moving object to the server device for each predetermined transmission period, and
wherein the server device:
downloads and saves the generated captured image and the extracted flow line information of the moving object for each predetermined transmission period,
causes a pass line to be displayed,
causes a number representing a count result of moving objects that cross the pass line during a target period, within a predetermined transmission period, to be displayed adjacent the pass line,
causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
receives, from the user via the displayed selection of the plurality of image leap commands, a selection of a predefined discrete time instance of the plurality of predefined discrete time instances, and
when the selected predefined discrete time instance is within the predetermined transmission period, changes the number representing the count result of moving objects that cross the pass line during the target period displayed at a first timing to a number representing a count result of moving objects that cross the pass line for the selected predefined discrete time instance that is a predetermined time period before the first timing or a predetermined time period after the first timing.

2. The flow line analysis system according to claim 1, wherein the camera device repeatedly generates the captured image.

3. The flow line analysis system of claim 1, wherein the server device generates a flow line analysis image in which the flow line information of the moving object is superimposed on the captured image and causes display of a first flow line analysis image generated based on a captured image and flow line information in a first period which is arbitrarily designated, and receives an instruction by a user operation to shift the first period by an amount, and
when the server device receives the instruction when the first flow line analysis image is displayed, the server device sets a second period by shifting the first period by the amount without changing a length in period, and causes display of a second flow line analysis image generated based on a captured image and flow line information in the second period.

4. The flow line analysis system of claim 1, wherein the number representing a count result represents a number of moving objects that cross the pass line in a first direction.

5. The flow line analysis system of claim 4, wherein the server device causes another number representing a count result of moving objects that cross the pass line in a second direction, different from the first direction, to be displayed adjacent the pass line.

6. The flow line analysis system of claim 1, wherein the server device:
when the pass line and the number representing the count result of moving objects that cross the pass line during the target period is displayed, causes a plurality of camera selection buttons, respectively corresponding to a plurality of cameras including the camera, to be displayed, each displayed camera selection button of the plurality of camera selection buttons corresponding to a camera having respective generated captured image and extracted flow line information downloaded from the camera to the server,
receives, from a user, a selection of a camera selection button from the plurality of camera selection buttons, and
in response to receiving the selection of the camera selection button from the plurality of camera selection buttons,
retrieves the generated captured image and the extracted flow line information of the camera corresponding to the selected camera selection button, and
causes the pass line and the number representing the count result of moving objects that cross the pass line of the camera corresponding to the selected camera selection button to be displayed.

7. A flow line analysis system in which a camera device and a server device are connected to each other,
wherein the camera device:
generates a background image of a captured image,
extracts flow line information relating to a staying position or a passing position of a moving object, and
transmits the generated background image, and the extracted flow line information of the moving object to the server device for each predetermined transmission period, and
wherein the server device:
downloads and saves the generated captured image and the extracted flow line information of the moving object for each predetermined transmission period,
causes a pass line to be displayed,
causes a number representing a count result of moving objects that cross the pass line during a target period within a predetermined transmission period, to be displayed adjacent the pass line,
causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
receives, from the user via the displayed selection of the plurality of image leap commands, a selection of a predefined discrete time instance of the plurality of predefined discrete time instances, and
when the selected predefined discrete time instance is within the redetermined transmission period, changes the number representing the count result of moving objects that cross the pass line during the target period displayed at a first timing to a number representing a count result of moving objects that cross the pass line for the selected predefined discrete time instance that is a predetermined time period before the first timing or a predetermined time period after the first timing.

8. The flow line analysis system according to claim 7, wherein the camera device repeatedly generates the background image.

9. The flow line analysis system of claim 7, wherein the server device generates a flow line analysis image in which the flow line information of the moving object is superimposed on the background image and causes display of a first flow line analysis image which is generated based on a background image and flow line information in a first period, and then causes display of a second flow line analysis image which is generated based on a background image and flow line information in a second period when receiving a period changing operation.

10. A flow line analysis method in a flow line analysis system in which a camera device and a server device are connected to each other,
wherein the camera device:
generates a captured image,
extracts flow line information relating to a staying position or a passing position of a moving object, and
transmits the generated captured image, and the extracted flow line information of the moving object to the server device for each predetermined transmission period, and
wherein the server device:
downloads and saves the generated captured image and the extracted flow line information of the moving object for each predetermined transmission period,
causes a pass line to be displayed,
causes a number representing a count result of moving objects that cross the pass line during a target period, within a predetermined transmission period, to be displayed adjacent the pass line,
causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
receives, from the user via the displayed selection of the plurality of image leap commands, a selection of a predefined discrete time instance of the plurality of predefined discrete time instances, and
when the selected predefined discrete time instance is within the predetermined transmission period, changes the number representing the count result of moving objects that cross the pass line during the target period displayed at a first timing to a number representing a count result of moving objects that cross the pass line for the selected predefined discrete time instance that is a predetermined time period before the first timing or a predetermined time period after the first timing.

11. The flow line analysis method according to claim 10, wherein the camera device repeatedly generates the captured image.

12. The flow line analysis method of claim 10, wherein the server device generates a flow line analysis image in which the flow line information of the moving object is superimposed on the captured image and causes display of a first flow line analysis image generated based on a captured image and flow line information in a first period which is arbitrarily designated, and receives an instruction by a user operation to shift the first period by an amount, and
when the server device receives the instruction when the first flow line analysis image is displayed, the server device sets a second period by shifting the first period by the amount without changing a length in period, and causes display of a second flow line analysis image generated based on a captured image and flow line information in the second period.

13. A flow line analysis method in a flow line analysis system in which a camera device and a server device are connected to each other,
wherein the camera device:
generates a background image of a captured image,
extracts flow line information relating to a staying position or a passing position of a moving object, and
transmits the generated background image, and the extracted flow line information of the moving object to the server device for each predetermined transmission period, and
wherein the server device:
downloads and saves the generated captured image and the extracted flow line information of the moving object for each predetermined transmission period,
causes a pass line to be displayed,
causes a number representing a count result of moving objects that cross the pass line during a target period, within a predetermined transmission period, to be displayed adjacent the pass line,
causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
receives, from the user via the displayed selection of the plurality of image leap commands, a selection of a predefined discrete time instance of the plurality of predefined discrete time instances, and
when the selected predefined discrete time instance is within the predetermined transmission period, changes the number representing the count result of moving objects that cross the pass line during the target period displayed at a first timing to a number representing a count result of moving objects that cross the pass line for the selected predefined discrete time instance that is a predetermined time period before the first timing or a predetermined time period after the first timing.

14. The flow line analysis method according to claim 13, wherein the camera device repeatedly generates the background image.

15. The flow line analysis method of claim 13, wherein the server device generates a flow line analysis image in which the flow line information of the moving object is superimposed on the background image and causes display of a first flow line analysis image which is generated based on a background image and flow line information in a first period, and then causes display of a second flow line analysis image which is generated based on a background image and flow line information in a second period when receiving a period changing operation.

16. A flow line analysis system in which a camera device and a server device are connected to each other,
   wherein the camera device:
      generates a captured image,
      extracts flow line information relating to a staying position or a passing position of moving objects,
      counts a number of the moving objects passing at least one line during a target period based on the extracted flow line information, the at least one line designated by the server device or an input device with respect to the captured image, and
      transmits the generated captured image, the extracted flow line information of the moving objects, and the count number corresponding to the at least one line to the server device for each predetermined transmission period, and
   wherein the server device:
      downloads and saves the generated captured image, the extracted flow line information of the moving objects, and the count number corresponding to the at least one line for each predetermined transmission period,
      generates a count number image in which the at least one line and the count number corresponding to the at least one line is superimposed on the captured image,
      causes display of the generated count number image on a display,
      causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
      receives, from the user via the displayed selection of the plurality of image leap commands, a selection of a predefined discrete time instance of the plurality of predefined discrete time instances, and
      when the selected predefined discrete time instance is within the predetermined transmission period, switches the generated count number image, displayed at the time of operation of changing a timing of the target period, to another generated count number image for the selected predefined discrete time instance that is a predetermined time period before the generated count number image or a predetermined time period after the generated count number image.

17. The flow line analysis system according to claim 16, wherein the camera device repeatedly generates the captured image.

18. The flow line analysis system according to claim 16, wherein the camera device derives a cumulative total of moving objects which pass the at least one line in one direction as the count number.

19. The flow line analysis system according to claim 16, wherein the camera device derives a cumulative total of moving objects which pass the at least one line in one direction, and a cumulative total of moving objects which pass the at least one line in a direction opposite to the one direction as the count number.

20. The flow line analysis system of claim 16, wherein the server device causes displays of a first count number image generated based on a captured image and flow line information in a first period which is arbitrarily designated and the count number corresponding to the at least one line, and receives an instruction by a user operation to shift the first period by an amount, and
   when the server device receives the instruction when the first count number image is displayed, the server device sets a second period by shifting the first period by the amount without changing a length in period, and causes display of a second count number image generated based on a captured image and flow line information in the second period and the count number corresponding to the at least one line.

21. A flow line analysis system in which a camera device and a server device are connected to each other,
   wherein the camera device:
      generates a background image of a captured image,
      extracts flow line information relating to a staying position or a passing position of moving objects,
      counts a number of the moving objects passing at least one line during a target period based on the extracted flow line information, the at least one line designated by the server device or an input device with respect to the captured image, and
      transmits the generated background image, the extracted flow line information of the moving objects, and the count number corresponding to the at least one line to the server device for each predetermined transmission period, and
   wherein the server device:
      downloads and saves the generated captured image, the extracted flow line information of the moving objects, and the count number corresponding to the at least one line for each predetermined transmission period,
      generates a count number image in which the at least one line and the count number corresponding to the at least one line is superimposed on the background image,
      causes display of the generated count number image on a display,
      causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
      receives, from the user via the displayed selection of the plurality of image leap commands, a selection of a predefined discrete time instance of the plurality of predefined discrete time instances, and
      when the selected predefined discrete time instance is within the predetermined transmission period, switches the generated count number image, displayed at the time of operation of changing a timing of the target period, to another generated count number image for the selected predefined discrete time instance that is a predetermined time period before the generated count number image or a predetermined time period after the generated count number image.

22. The flow line analysis system according to claim 21, wherein the camera device repeatedly generates the background image.

23. The flow line analysis system according to claim 21, wherein the camera device derives a cumulative total of moving objects which pass the at least one line in one direction as the count number.

24. The flow line analysis system according to claim 21, wherein the camera device derives a cumulative total of moving objects which pass the at least one line in one direction, and a cumulative total of moving objects which pass the at least one line in a direction opposite to the one direction as the count number.

25. The flow line analysis system of claim 21, wherein the server device causes display of a first count number image which is generated based on a background image and flow line information in a first period and the count number corresponding to the at least one line, and then causes display of a second count number image which is generated based on a background image and flow line information in a second period and the count number corresponding to the at least one line when receiving a period changing operation.

26. A flow line analysis method in a flow line analysis system in which a camera device and a server device are connected to each other,
wherein the camera device:
generates a captured image,
extracts flow line information relating to a staying position or a passing position of moving objects,
counts a number of the moving objects passing at least one line during a target period based on the extracted flow line information, the at least one line designated by the server device or an input device with respect to the captured image, and
transmits the generated captured image, the extracted flow line information of the moving objects, and the count number corresponding to the at least one line to the server device for each predetermined transmission period, and
wherein the server device:
downloads and saves the generated captured image, the extracted flow line information of the moving objects, and the count number corresponding to the at least one line for each predetermined transmission period,
generates a count number image in which the at least one line and the count number corresponding to the at least one line is superimposed on the captured image,
causes display of the generated count number image on a display,
causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
receives, from the user via the displayed selection of the plurality of image leap commands, a selection of a predefined discrete time instance of the plurality of predefined discrete time instances, and
when the selected predefined discrete time instance is within the predetermined transmission period, switches the generated count number image, displayed at the time of operation of changing a timing of the target period, to another generated count number image for the selected predefined discrete time instance that is a predetermined time period before the generated count number image or a predetermined time period after the generated count number image.

27. The flow line analysis method of claim 26, wherein the server device causes display of a first count number image generated based on a captured image and flow line information in a first period which is arbitrarily designated and the count number corresponding to the at least one line, and receives an instruction by a user operation to shift the first period by an amount, and
when the server device receives the instruction when the first count number image is displayed, the server device sets a second period by shifting the first period by the amount without changing a length in period, and causes display of a second count number image generated based on a captured image and flow line information in the second period and the count number corresponding to the at least one line.

28. A flow line analysis method in a flow line analysis system in which a camera device and a server device are connected to each other,
wherein the camera device:
generates a background image of a captured image,
extracts flow line information relating to a staying position or a passing position of moving objects,
counts a number of the moving objects passing at least one line during a target period based on the extracted flow line information, the at least one line designated by the server device or an input device with respect to the captured image, and
transmits the generated background image, the extracted flow line information of the moving objects, and the count number corresponding to the at least one line to the server device for each predetermined transmission period, and
wherein the server device:
downloads and saves the generated captured image, the extracted flow line information of the moving objects, and the count number corresponding to the at least one line for each predetermined transmission period,
generates a count number image in which the at least one line and the count number corresponding to the at least one line is superimposed on the background image,
displays the generated count number image on a display,
causes a selection of a plurality of image leap commands respectively associated with a plurality of predefined discrete time instances to be displayed, a first set of the plurality of predefined discrete time instances temporally preceding the target period and a second set of the plurality of predefined discrete time instances temporally succeeding the target period,
receives, from the user via the displayed selection of the plurality of image leap commands, a selection of a predefined discrete time instance of the plurality of predefined discrete time instances, and
when the selected predefined discrete time instance is within the predetermined transmission period, switches the generated count number image, displayed at the time of operation of changing a timing of the target period, to another generated count number image for the selected predefined discrete time instance that is a predetermined time period before the generated count number image or a predetermined time period after the generated count number image.

29. The flow line analysis method of claim 28, wherein the server device causes display of a first count number image which is generated based on a background image and flow line information in a first period and the count number corresponding to the at least one line, and then causes display of a second count number image which is generated based on a background image and flow line information in a second period and the count number corresponding to the at least one line when receiving a period changing operation.

\* \* \* \* \*